US 6,626,206 B1

(12) United States Patent
Ulcei et al.

(10) Patent No.: US 6,626,206 B1
(45) Date of Patent: Sep. 30, 2003

(54) FEEDBLOCK FOR ADJUSTING THE DIMENSIONS OF A SET OF CO-EXTRUDED LAYERS OF A MULTI-LAYER SHEET

(75) Inventors: John A. Ulcei, Colfax, WI (US); Dale P. Pitsch, Jim Falls, WI (US)

(73) Assignee: Extrusion Dies, Inc., Chippewa Falls, WI (US)

( * ) Notice: Subject to any disclaimer, the term of this patent is extended or adjusted under 35 U.S.C. 154(b) by 0 days.

(21) Appl. No.: 09/496,022

(22) Filed: Jan. 20, 2000

(51) Int. Cl.[7] .................. B29C 47/10; B29C 47/70; F16K 11/10; F16K 11/70
(52) U.S. Cl. ............. 137/606; 137/876; 137/884; 251/120; 251/310; 264/40.7; 264/173.12; 425/131.1; 425/133.5; 425/381; 425/382 R; 425/462; 425/463; 425/466
(58) Field of Search .................. 137/606, 884, 137/876; 251/310, 367, 120, 121; 264/40.7, 173.12, 173.13, 514, 516; 425/130, 131.1, 133.5, 328.1, 381, 382 R, 382.3, 382.4, 462, 463, 464, 466; 138/45, 46

(56) References Cited

U.S. PATENT DOCUMENTS

| | | | |
|---|---|---|---|
| 3,003,245 A | 10/1961 | Nunez, Jr. | 33/180 |
| 3,032,008 A | 5/1962 | Land et al. | 118/411 |
| 3,097,058 A | 7/1963 | Branscum et al. | 18/55 |
| 3,223,761 A | 12/1965 | Raley | 264/95 |
| 3,397,428 A | 8/1968 | Donald | 18/13 |
| 3,443,277 A | 5/1969 | Frielingsdorf | 18/12 |
| 3,448,183 A | 6/1969 | Chisholm | 264/37 |
| 3,479,425 A | 11/1969 | Lefevre et al. | 264/171 |
| 3,504,402 A | 4/1970 | Wetz et al. | 18/13 |
| 3,557,265 A | 1/1971 | Chisholm et al. | 264/47 |
| 3,583,032 A | 6/1971 | Stafford | 18/13 |
| 3,587,281 A | 6/1971 | Lemelson | 72/265 |
| 3,761,211 A | 9/1973 | Parkinson | 425/131 |

(List continued on next page.)

FOREIGN PATENT DOCUMENTS

| | | |
|---|---|---|
| DE | 26 29 333 A | 1/1978 |
| DE | 28 51 930 A | 6/1980 |

(List continued on next page.)

OTHER PUBLICATIONS

Drawings from the Davis Standard Company showing a feedblock design, circa 1983.

European Search Report dated Dec. 10, 1992, European Patent Appl. No. EP 93 30 6723.

*Primary Examiner*—George L. Walton
(74) *Attorney, Agent, or Firm*—McCracken & Frank

(57) ABSTRACT

A feedblock for supplying a multi-layer stream of polymeric material to an extrusion die is provided wherein the dimension of at least some of the layers of the multi-layer stream can be precisely adjusted and/or controlled. The feedblock includes a primary flow path which is used to create a first layer and two secondary flow paths which are used to create a set of second and third layers. The secondary flow paths are positioned relative to the primary flow path such that the second and third layers are deposited on opposing sides of the primary layer in a sandwich-like configuration. Each of the secondary flow paths include a contoured slot through which a secondary fluid stream of polymeric material is deposited onto a primary stream of polymeric fluid flowing in the primary flow path. The contoured slot is geometrically shaped such that adjusting the position of the contoured slot alters the shape of the secondary fluid stream as it is deposited onto the primary flow path. A set of heaters disposed within the feedblock are positioned on either side of the combined primary and secondary flow paths adjacent to the exit port of the feedblock and are used to heat the secondary streams thereby altering the flow characteristics of the streams which, in turn, causes a corresponding change in the dimensions and profiles of the secondary fluid streams.

23 Claims, 17 Drawing Sheets

U.S. PATENT DOCUMENTS

| | | | |
|---|---|---|---|
| 3,807,918 A | 4/1974 | Chill et al. ................. 425/131 |
| 3,830,610 A | 8/1974 | Onkawa ..................... 425/141 |
| 3,860,372 A | 1/1975 | Newman, Jr. ............ 425/133.1 |
| 3,909,170 A | 9/1975 | Riboulet et al. ......... 425/133.5 |
| 3,927,957 A | 12/1975 | Chill et al. .............. 425/131.1 |
| 4,152,387 A | 5/1979 | Cloeren ...................... 264/171 |
| 4,171,195 A | 10/1979 | Klein et al. ................. 425/141 |
| 4,185,951 A | 1/1980 | Webermeier et al. ..... 425/133.5 |
| 4,189,292 A | 2/1980 | Hureau et al. .............. 425/290 |
| 4,197,069 A | 4/1980 | Cloeren .................... 425/131.1 |
| 4,240,782 A | 12/1980 | McPhee et al. ............. 425/467 |
| 4,281,683 A * | 8/1981 | Hetherington et al. ...... 137/606 |
| 4,285,655 A | 8/1981 | Matsubara .................. 425/461 |
| 4,289,560 A | 9/1981 | Simons ................. 156/244.18 |
| 4,295,812 A | 10/1981 | Hoddinott ................... 425/114 |
| 4,316,868 A | 2/1982 | Esposito et al. ............. 264/171 |
| 4,395,217 A * | 7/1983 | Benadi' ...................... 425/464 |
| 4,405,547 A | 9/1983 | Koch et al. .................. 264/171 |
| 4,422,839 A | 12/1983 | Przytulla et al. ............. 425/465 |
| 4,435,141 A | 3/1984 | Weisner et al. ........... 425/131.1 |
| 4,439,125 A | 3/1984 | Dieckmann et al. ........ 425/140 |
| 4,443,397 A | 4/1984 | Hahn et al. .................. 264/171 |
| 4,469,130 A * | 9/1984 | James et al. ................. 137/606 |
| 4,470,790 A | 9/1984 | Harada et al. .......... 425/192 R |
| 4,483,669 A | 11/1984 | Hahn et al. ............... 425/131.1 |
| 4,483,812 A | 11/1984 | Hahn et al. .................. 264/171 |
| 4,484,883 A | 11/1984 | Honda et al. ................ 425/462 |
| 4,521,359 A | 6/1985 | Tsien .......................... 264/104 |
| 4,524,099 A | 6/1985 | Di Luccio .................. 428/213 |
| 4,533,308 A | 8/1985 | Cloeren ................... 425/131.1 |
| 4,533,510 A | 8/1985 | Nissel ......................... 264/171 |
| 4,552,521 A | 11/1985 | Linnstaedter ............ 425/131.1 |
| 4,562,023 A | 12/1985 | Pabst et al. .................... 264/75 |
| 4,573,493 A * | 3/1986 | Hammarstedt .............. 137/606 |
| 4,579,696 A | 4/1986 | Di Luccio .................... 264/22 |
| 4,600,550 A | 7/1986 | Clören ....................... 264/171 |
| 4,619,802 A | 10/1986 | Cloeren ...................... 264/171 |
| 4,652,225 A | 3/1987 | Dehennau et al. ........ 425/133.1 |
| 4,669,965 A | 6/1987 | Murakami ............... 425/133.5 |
| 4,695,236 A | 9/1987 | Predohl et al. ........... 425/131.1 |
| 4,708,617 A | 11/1987 | Herrington ............... 425/133.5 |
| 4,756,858 A | 7/1988 | Reifehauser et al. ........... 264/37 |
| 4,780,258 A | 10/1988 | Cloeren ...................... 264/171 |
| 4,784,815 A | 11/1988 | Cloeren et al. .............. 264/171 |
| 4,789,513 A | 12/1988 | Cloeren ...................... 264/171 |
| 4,880,370 A | 11/1989 | Krumm ................... 425/133.5 |
| 4,911,628 A | 3/1990 | Heilmayr et al. ......... 425/131.1 |
| 5,020,984 A | 6/1991 | Cloeren et al. .............. 425/141 |
| 5,066,435 A | 11/1991 | Lorenz et al. .............. 264/40.5 |
| 5,066,443 A | 11/1991 | Cloeren ...................... 264/171 |
| 5,088,909 A | 2/1992 | Laarmann ................ 425/131.1 |
| 5,094,788 A | 3/1992 | Schrenk et al. ............. 264/171 |
| 5,094,793 A | 3/1992 | Schrenk et al. ............. 264/171 |
| 5,102,323 A | 4/1992 | Blemberg ................ 425/133.5 |
| 5,106,562 A | 4/1992 | Blemberg et al. ........... 264/171 |
| 5,110,276 A | 5/1992 | Farnsworth et al. ...... 425/133.1 |
| 5,120,484 A | 6/1992 | Cloeren ...................... 264/171 |
| 5,122,905 A | 6/1992 | Wheatley et al. ........... 359/586 |
| 5,122,906 A | 6/1992 | Wheatley ................... 359/586 |
| 5,126,880 A | 6/1992 | Wheatley et al. ........... 359/587 |
| 5,137,675 A | 8/1992 | Rabe .......................... 264/171 |
| 5,147,195 A | 9/1992 | Cloeren ................... 425/133.5 |
| 5,211,898 A | 5/1993 | Shinmoto ................... 264/171 |
| 5,223,276 A | 6/1993 | Djordjevic et al. ....... 425/131.1 |
| 5,234,020 A * | 8/1993 | Orlandi ...................... 137/606 |
| 5,236,642 A | 8/1993 | Blemberg et al. .......... 264/40.7 |
| 5,238,385 A * | 8/1993 | Johnson ................... 425/382.3 |
| 5,269,995 A | 12/1993 | Ramanathan et al. ....... 264/171 |
| RE34,711 E | 8/1994 | Compagnon ............. 425/131.1 |
| 5,375,990 A * | 12/1994 | Krupa et al. ............. 425/133.5 |
| 5,489,402 A | 2/1996 | Knoblauch et al. ......... 264/407 |
| 5,573,720 A | 11/1996 | Kotzer .................. 264/171.15 |
| 5,711,349 A * | 1/1998 | Wissmann .................. 137/876 |
| 5,780,067 A | 7/1998 | Herrington et al. ...... 425/131.1 |

FOREIGN PATENT DOCUMENTS

| | | |
|---|---|---|
| EP | 0 418 681 | 3/1991 |
| EP | 0 589 567 | 3/1994 |
| JP | 55-28825 | 2/1980 |
| JP | 56-125 | 1/1981 |
| JP | 58-209529 | 12/1983 |
| JP | 59-220332 | 12/1984 |
| JP | 61-89823 | 5/1986 |
| JP | 61-270114 | 11/1986 |
| JP | 62-264925 | 11/1987 |
| JP | 11-70559 | 3/1999 |
| RU | 397357 | 1/1974 |

* cited by examiner

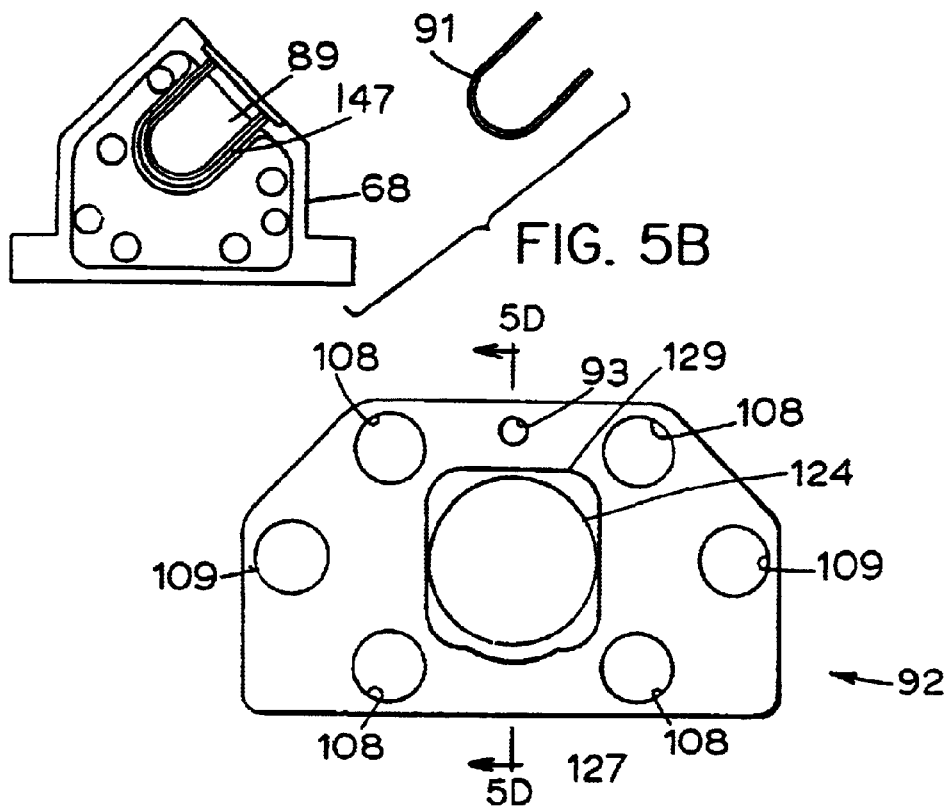
FIG. 5B
FIG. 5C
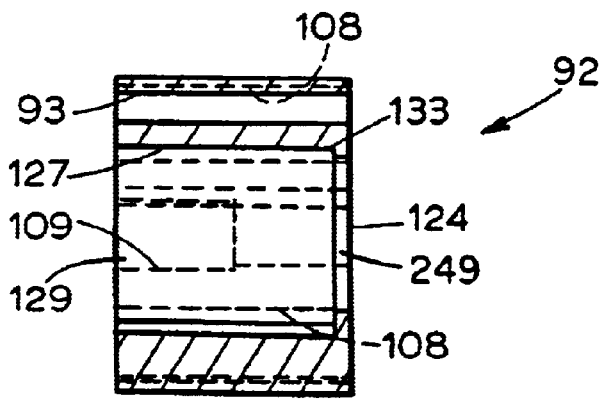
FIG. 5D

FEEDBLOCK FOR ADJUSTING THE DIMENSIONS OF A SET OF CO-EXTRUDED LAYERS OF A MULTI-LAYER SHEET

FIELD OF THE INVENTION

The present invention relates generally to a feedblock for an extrusion die, and more particularly to a feedblock for creating a multi-layer polymeric sheet wherein the dimensions of at least some of the layers are adjustable.

BACKGROUND ART

Extrusion processes generally involve forcing a viscous material through a die typically comprising an inlet, a cavity, and an exit. In many instances, the end-product of the extrusion process is a sheet comprising a single layer of polymeric material. In other instances, however, it is desirable to produce a sheet of formable material having a plurality of distinct layers that comprise different materials having different properties. By using different materials having different properties to create each layer, the resulting multi-layer sheet has the combined properties of all of the layers. For example, it may desirable to create a food wrap bars oxygen so that food stored therein remains fresh. However, materials that act as oxygen barriers are typically structurally weak. Thus, it may be desirable to create a food wrap that acts as an oxygen barrier and that is structurally strong by combining a layer made from a material having the. characteristics of an oxygen barrier with a layer made from a material that is known for its structural integrity and strength.

Methods known in the art for creating multi-layer sheets typically involve combining a plurality of polymeric streams wherein each stream comprises a different material and wherein each stream forms a distinct layer of the sheet. More advanced methods for creating multi-layer sheets additionally include ways to control and adjust the dimensions of the co-extruded layers of a multi-layer sheet. Controlling and adjusting the dimensions of the co-extruded layers is useful for a variety of reasons including, for example, to further affect the properties of the resulting multi-layer sheet. More specifically, depending upon the materials used to form the layers, the thickness of the layers may affect the surface finish of the resulting multi-layer sheet causing it to be either clear or opaque. In addition, it is necessary to ensure that the dimensions of the various layers are consistent throughout the sheet to ensure that the properties of the resulting multi-layer sheet are uniform throughout the sheet. Also, it is necessary that the layer widths be equal and precisely positioned so that uniformity is maintained at the edges of the sheet. In addition, dimension control can also be used to control fabrication costs. As an example, a base material may be coated with a layer of resin that shields the base material from UV rays. The protective resin layer must be at least of a minimum thickness in order to achieve adequate UV protection. However, UV protective resins are costly, and therefore it is desirable to use only as much as needed to obtain the required level of UV protection. Accordingly, precise dimensional control over layer thickness is required so that costs are minimized.

Murakami U.S. Pat. No. 4,669,965 discloses a multi-layer extrusion die having an integrate that resides within a cavity of the die body and that comprises a set of flat plates disposed on top of one another. To produce a multi-layer sheet, a stream of resin is supplied to a flow inlet disposed in each plate and the stream thereafter flows into a downstream portion of the plate having a wide and flat geometry. As the resin stream enters the downstream portion of the plate it conforms to the wide and flat geometry of the downstream portion thereby causing individual layer-like streams to form in each plate. The layer-like streams then enter into a flow-combining zone where the streams are deposited one on top of the other. The dimensions of the layers, such as the width or thickness of the various layers, are dictated by the geometry of the plates and the flow passages of the die. To create a set of layers having a desired width or thickness, a set of suitably sized plates must be fabricated and inserted into the integrate which is then inserted into the die body. However, to create a new set of layers having a different set of dimensions, a different, properly sized set of plates must be fabricated for insertion into the integrate.

Similarly, Blemberg U.S. Pat. No. 5,236,642 discloses an apparatus comprising an encapsulator, a feedblock and a die wherein two melt streams are combined in the encapsulator to produce an encapsulated layer element that is thereafter supplied to the feedblock 62 via an elongate transport pipe. Within the feedblock 62, the encapsulated layer element is combined with yet another stream and the resulting layered stream thereafter flows into a main channel disposed within the die body. The main channel converges with two auxiliary flow channels that are also disposed within the die body such that the materials flowing in the two auxiliary flow channels combine with the layered stream of the main channel to form a multi-layer sheet. Like Murakami, Blemberg et al. also teaches that the dimensions of the individual layers are a function of the geometry of the flow passages within the feedblock or die. More particularly, Blemberg et al. reduces the variations in the thickness of a layer by passing the layered stream that exits the encapsulator through the elongate transport pipe. According to Blemberg et al., passing the stream through the elongate transport pipe tends to automatically correct any asymmetry, non-concentricity or other non-uniformity which may exist in the combined melt stream as it leaves the encapsulator, thereby resulting in a more uniform melt stream thickness. In addition, Blemberg et al. teaches that the thickness of a set of two layers can be adjusted by altering the flow rates of the two streams that form the individual layers.

However, methods that rely upon the geometry of fixed flow channels in a feedblock or die to produce a sheet with layers having a desired set of dimensions are of limited value because the dimensions of the streams, and thus, the layers, cannot be adjusted without changing the geometry of the flow channels. This, in turn, requires the design and fabrication of a different feedblock or die. In addition, methods that rely upon the relative flow rates of the streams to adjust the dimensions of the layers require that new flow rates be established for each stream in order to achieve the new set of desired dimensions.

SUMMARY OF THE INVENTION

Other advantages of the invention will be apparent to those skilled in the art from the following detailed description taken in conjunction with the drawings and the appended claims.

In accordance with one aspect of the present invention, a feedblock includes a first passage defining a first flow path and a second passage defining a second flow path in fluid communication with the first flow path. In addition, a rotatable member having a passage therethrough forms at least a part of the second flow path and terminates at a convergence zone at which the second flow path meets the first flow path. Rotation of the rotatable member changes a size of the convergence zone.

Preferably, the rotatable member comprises a hollow spool. Also preferably, the convergence zone is defined by an opening in the rotatable member. Further, the opening in the rotatable member may be contoured or rectangular.

Still further in accordance with the preferred embodiment, the feedblock includes an adjustment apparatus coupled to the rotatable member. Also, the adjustment apparatus may include an adjustment lever coupled to the rotatable member and an adjustment screw threaded into a bore carried by the adjustment lever. In addition, the adjustment apparatus may further include indicating apparatus coupled to the rotatable member and operable to indicate a position of the rotatable member.

Also, according to the preferred embodiment, the feedblock may additionally include an adapter coupled to the second flow path by which a formable material is supplied to the second flow path.

Preferably, the feedblock further includes a third flow passage defining a third flow path that is also in fluid communication with the first flow path and a second rotatable member having a passage therethrough. The passage of the second rotatable member forms at least a part of the third flow path and terminates at a second convergence zone at which the third flow path meets the first flow path. Rotation of the second rotatable member changes a size of the second convergence zone.

In addition, to the foregoing, the feedblock may further include a set of heaters disposed within a body of the feedblock and disposed parallel to a portion of the first flow path that is located downstream of the convergence zone. The set of heaters may be controllable to control a viscosity of a formable material flowing through the portion of the first flow path that is located downstream of the convergence zone.

In a further embodiment of the present invention, a feedblock may include a primary passage defining a primary flow path, and a plurality of secondary passages, each defining one of a plurality of secondary flow paths that are in fluid communication with the primary flow path. The feedblock may further include a plurality of rotatable members, each rotatable member having a channel therethrough that forms at least a part of one of the secondary flow paths and each of the channels terminating at one of a plurality of convergence zones, wherein each convergence zone is defined by a region in which one of the secondary flow paths meets the primary flow path and wherein rotation of each of the rotatable members changes a size of a corresponding one of the convergence zones.

Other aspects and advantages of the present invention will become apparent upon consideration of the following drawings and detailed description.

BRIEF DESCRIPTION OF THE DRAWINGS

FIG. 5B comprises a side elevational view of a lower portion of the dividing adapter of FIG. 5A;

FIG. 5C comprises a side elevational view of a guideblock of the dividing adapter of FIG. 5A;

FIG. 5D comprises a cross-sectional view of the guideblock of FIG. 5C taken generally along the lines 5D—5D of FIG. 5C;

DETAILED DESCRIPTION OF THE INVENTION

Figure 1:
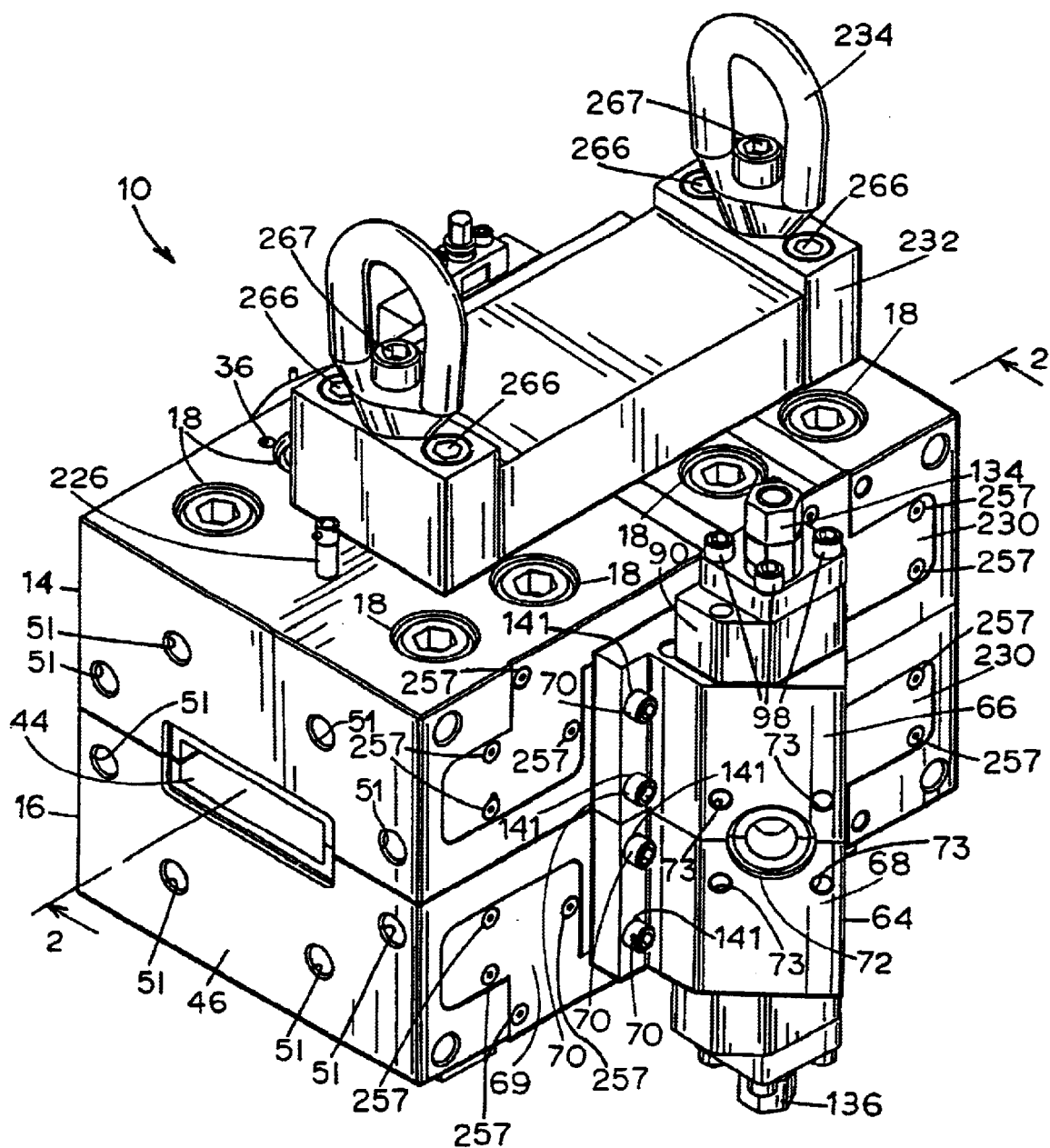
FIG. 1 comprises an isometric view of a feedblock according to the present invention wherein the feedblock is positioned to reveal a first side at which an inlet port is disposed, a second side at which a dividing adapter is disposed, and a top of the feedblock.
Figure 2:
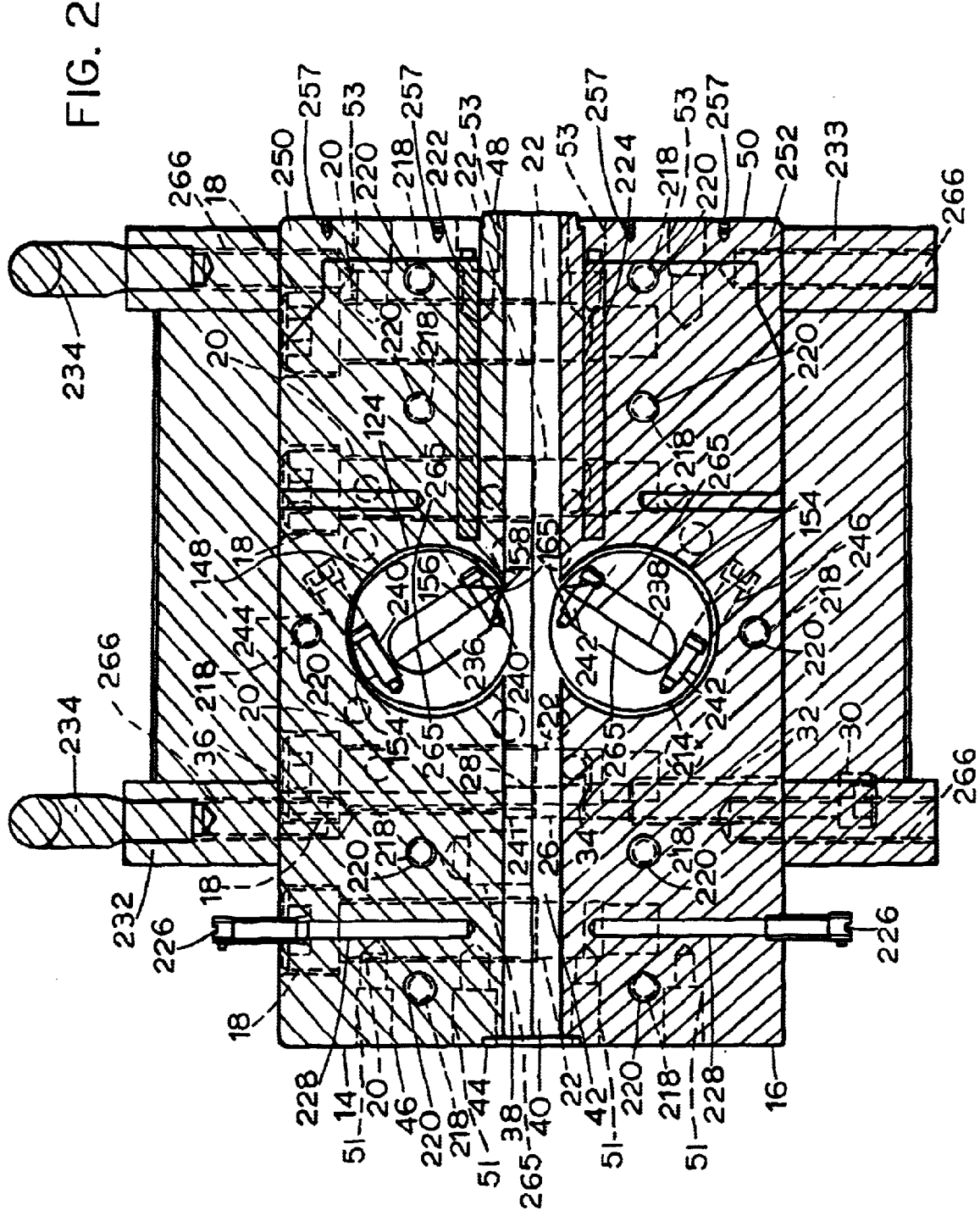
FIG. 2 comprises a cross-sectional view of the feedblock with the dividing adapter and an adjustment assembly removed, wherein the view is taken generally along the lines 2—2 of FIG. 1.

Referring now to the drawings, wherein like reference numerals designate identical or corresponding parts throughout the several views, and more particularly to FIGS. 1 and 2, a feedblock 10 includes an upper body 14 and a lower body 16. The upper body 14 and lower body 16 are bolted together by a plurality of threaded bolts 18 that are disposed in aligned, cylindrically shaped bores 20, 22 in the upper body 14 and the lower body 16, respectively. The cylindrically shaped bores 22 disposed in the lower body are threaded to engage and fasten the threaded bolts 18. To facilitate alignment between the upper body 14 and the lower body 16, a dowel pin 24 extends through and projects out of a bore 26 disposed in the lower body 16 and extends into a bore 28 disposed in the upper body 14. A threaded jack bolt 30 is fastened into a threaded bore 32 and is positioned such that an end 34 of the jack bolt 30 abuts against the bottom of the dowel pin 24. To separate the upper body 14 from the lower body 16, the jack bolt 30 is rotated causing the jack bolt 30 to extend farther into the threaded bore 32 and causing the jack bolt 30 to apply a force against the bottom of the dowel pin 24. The force applied to the bottom of the dowel pin 24, in turn, causes the dowel pin 24 to press against the upper body 14 thereby causing the upper body 14 to separate from the lower body 16. A through hole 36 extends through the upper body 14 and is disposed such that a rod (not shown) placed into the through hole 36 can be forced against the top of the dowel pin 24, thereby allowing the dowel pin 24 to be pushed out of the bore 28 in the event that it becomes lodged in the upper body 14. The ability to separate the upper body 14 from the lower 16 facilitates cleaning of the interior cavities (described hereinafter) of the feedblock 10.

The upper body 14 and lower body 16 include channels 38, 40, respectively, which, when the upper and lower bodies 14 and 16 are assembled together, together form a primary flow path 42 that extends longitudinally through the feedblock 10 from an inlet port 44 disposed on a side 46 of the feedblock 10 to an outlet port 48 (see FIG. 2) disposed on an opposing side 50 of the feedblock 10. A set of bores 51, which may be threaded, enables the attachment of an upstream adaptor (not shown) to the side 46 of the feedblock 10 through which a formable material, such as a heated thermoplastic polymer material, may be supplied to the inlet port 44. Likewise, a set of bores 53 (see also FIG. 10A), which may also be threaded, enables the attachment of a downstream adaptor (not shown) to the side 50 of the feedblock 10 to which the formable material flowing from the outlet port 48 may be supplied.

Figure 3:
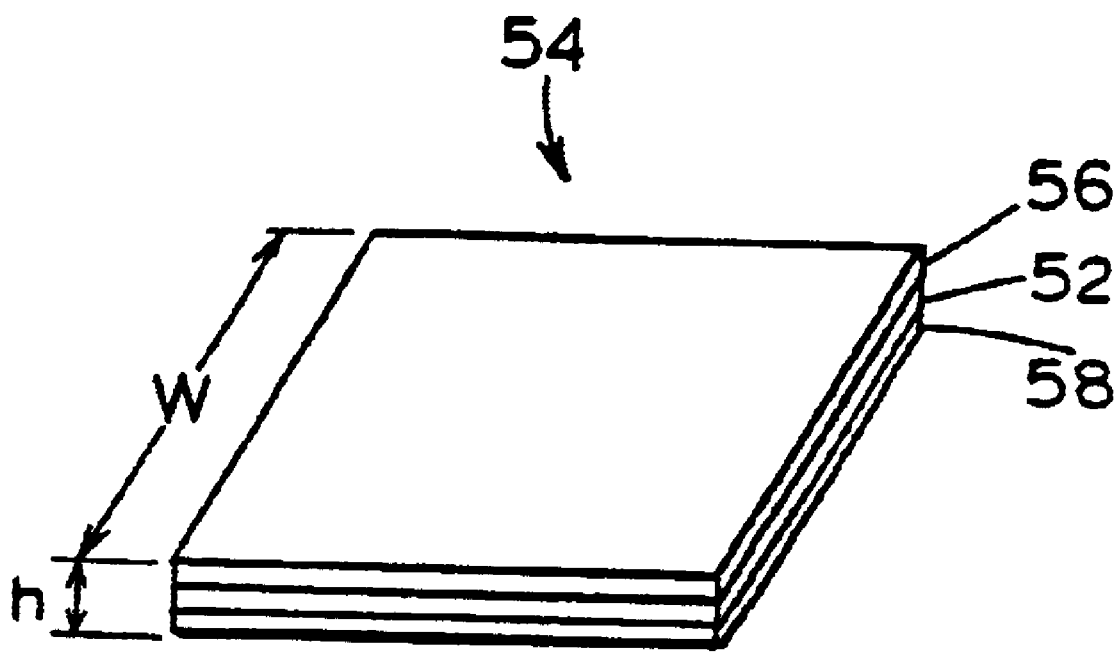
FIG. 3 comprises an isometric view of a multi-layer sheet created using the feedblock of FIG. 1.

Referring also to FIG. 3, the formable material supplied to the inlet port 44 flows through the primary flow path 42 and forms a first layer 52 of a multi-layer flow of material 54. Preferably, (although not necessarily) the multi-layer flow of material 54 includes three layers wherein the first layer 52 is sandwiched between a second layer 56 and a third layer 58. The dimensions of the layers 52, 56 and 58 are referred to hereinafter as the width and height of-the layers 52, 56 and 58 and are denoted in FIG. 3 with the letters "w" and "h," respectively.

Figure 4:
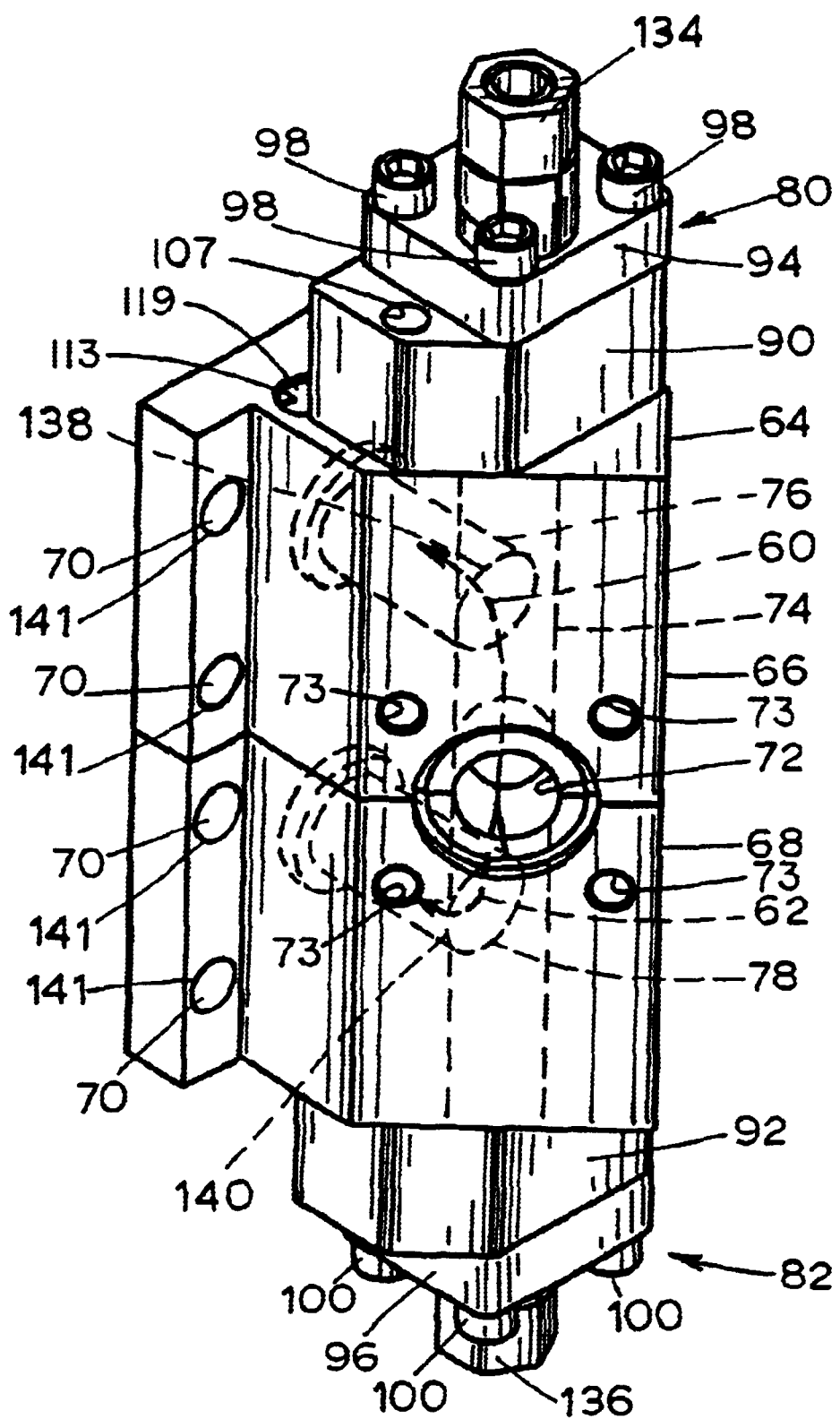
FIG. 4 comprises an enlarged isometric view of the dividing adapter of FIG. 1.

Referring now to FIGS. 1 and 4, to facilitate the formation of the second and the third layers 56 and 58 (see FIG. 3), two secondary flow paths 60, 62 (indicated with directional arrows in FIG. 4) are provided, both of which originate at a dividing adapter 64. Only portions of the secondary flow paths 60, 62 are shown in FIG. 4 and the remaining portions of the flow path 60 are shown in FIGS. 7A, 7B, 8 and 9 and described with reference thereto. The dividing adapter 64 includes an upper portion 66 and a lower portion 68 that are both secured to a side 69 of the feedblock 10 with a set of eight bolts 70 (only four of which are shown in FIG. 1) that extend through bores 141 into further bores 75 (see FIG. 12) in the feedblock 10. The dividing adapter 64 includes a circular inlet port 72 which, during operation, is coupled to an extruder (not shown) that is mounted to the dividing adapter 64 via the bores 73. The inlet port 72 is in fluid communication with a main passage 74 which is, in turn, in fluid communication with a set of channels 76 and 78, respectively, that are disposed in the upper and lower portions 66, 68 of the dividing adapter 64. The secondary flow path 60 begins at the inlet port 72, then flows into the main passage 74 and into the channel 76, whereas the secondary flow path 62 begins at the inlet port 72, then flows into the main passage 74 and into the channel 78.

Figure 5A:
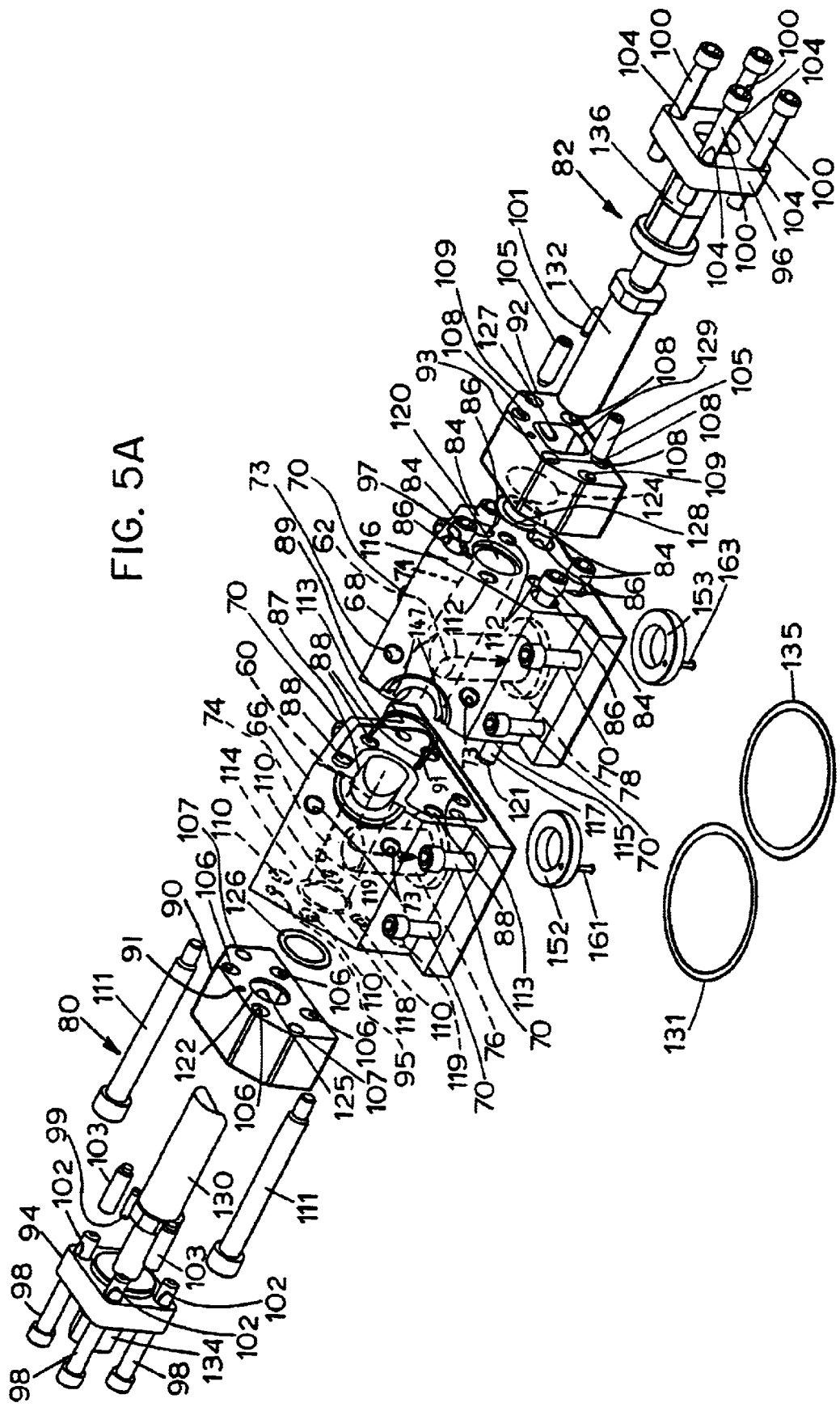
FIG. 5A comprises a rotated and exploded view of the dividing adapter of FIG. 4.

To control the flow of material from the main passage 74 into the channels 76 and 78, first and second valve assemblies 80, 82 are secured to the upper-and lower portions 66, 68, respectively, of the dividing adapter 64. Referring also to FIGS. 5A and 5B, the upper and lower portions 66, 68 are fastened to one another by a set of threaded bolts 84 that extend through a set of bores 86 disposed in the lower portion 68 and further are threaded into a set of aligned, threaded bores 88 disposed in the upper portion 66. Each of the upper and lower portions 66, 68 includes a semi-circular opening 87, 89, respectively, that is positioned such that when the upper and lower portions 66, 68 are aligned with and fastened to one another, the semi-circular openings 87 and 89 together form the circular inlet port 72 (see FIG. 1). A groove 147 is disposed in the throat of the semi-circular opening 89 and is dimensioned to accept a soft aluminum wire 91 (FIG. 5B) that, when disposed in the groove 147, prevents fluid leakage from occurring at the junction where the semi-circular openings 87 and 89 meet.

The valve assemblies 80, 82 include a valve guideblock 90, 92, respectively, and a retainer 94, 96, respectively. The valve guideblocks 90, 92 are secured to the retainers 94, 96 and to the upper and lower portions 66, 68, respectively, with a set of bolts 98, 100, respectively. The bolts 98, 100 extend through sets of bores 102, 104 in the retainers 94, 96, respectively, a set of aligned bores 106, 108 in the guideblocks 90, 92, respectively, and into a set of aligned threaded bores 110, 112 in the upper and lower portions 66, 68, respectively. Each guideblock 90, 92 abuts a planar face 114, 116 of the upper and lower portions 66, 68, respectively, and each of the upper and lower portions 66, 68 includes a shouldered circular opening 118, 120 that leads to the main passage 74 (see FIG. 4). Each of the shouldered openings 118, 120 aligns with a circular opening 122, 124 disposed in the guideblocks 90, 92, respectively. A circular o-ring 126 is disposed between the circular openings 118 and 122 to prevent leakage between the guideblock 90 and the upper portion 66. Similarly, a circular o-ring 128 is disposed between-the circular openings 120, 124 to prevent leakage between the guideblock 92 and the lower portion 68. The o-rings 126, 128 may be replaced by any other suitable sealing apparatus, if desired.

Each of the circular openings 122, 124 in the guideblocks 90, 92 provides access to a channel 125, 127 that extends through each of the guideblocks 90, 92, respectively. The openings 122, 124 further align with the openings 118 and 120 such that the channels 125 and 127 are also aligned with the main passage 74 of the dividing adapter 64. Tapered valve stems 130, 132 are disposed in the channels 125, 127, respectively, and extend into the main passage 74 of the dividing adapter 64. Each of the tapered valve stems 130, 132 threadably engages a nut 134, 136, respectively, that is captured axially by the retainer 94, 96, respectively, so that rotation of the nut 134, 136 causes the valve stem 130, 132, respectively, to extend into or retract out of the main passage 74. Referring again to FIG. 4, the valve stems 130, 132 may be extended to cover an opening 138 located between the main passage 74 and the channel 76 and an opening 140 located between the main passage 74 and the channel 78, respectively. Thus, the valve assemblies 80, 82 control the passage of material from an extruder (not shown) coupled to the inlet port 72 into the channels 76 and 78.

The channels 125, 127 are preferably identical and hence only the-channel 127 is shown and described in detail. The channels 125, 127 are dimensioned and configured both to enable passage of the tapered valve stems 130, 132, respectively, therethrough, and to prevent the fluid flowing through the main passage 74 from leaking into the guideblocks 90, 92. More particularly, and referring also to FIGS. 5C and 5D, a first portion 129 of the channel 127 is substantially square in cross-section and extends to a point 133 located near the opening 124. Between the point 133 and the opening 124, a second portion 249 of the channel 127 is circularly shaped in cross-section and dimensioned such that the tapered valve stem 130 fits snugly therein to prevent leakage of fluid from the main passage 74 into the guideblocks 90, 92. Of course, if differently shaped valve stems are utilized then the openings 118, 120, 122, 124 might alternatively be of a different cross-sectional configuration.

Each of the guideblocks 90, 92 includes a bore 91, 93, respectively, that aligns with a bore 95, 97 disposed in the upper and lower portions 66, 68, respectively. A dowel pin 99, 101 extends through each of the aligned bores 91, 95 and 93, 97, respectively, to facilitate alignment between each of the guideblocks 90, 92 and the upper and lower portions 66, 68 respectively. Two set screws 103, 105 are disposed in threaded passages 107, 109, respectively, in the guideblocks 90, 92, respectively. To separate the guideblocks 90, 92 from the upper and lower portions 66, 68, respectively, the set screws 103, 105 are threaded into the passages 107, 109, respectively, causing the set screws 103, 105 to press against the planar faces 114, 116 of the upper and lower portions 66, 68, respectively. The force applied by the set screws 103, 105 against the planar faces 114, 116, respectively, causes the guideblocks 90, 92 to separate from the upper and lower portions 66, 68, respectively. Likewise, to enable alignment of the upper portion 66 and the lower portion 68, two bores are 113 disposed in the upper portion 66 and are aligned with two bores 115 (only one of which is visible in FIG. 5) disposed in the lower portion 68. Two dowel pins 117 (only of which is visible in FIG. 5) are disposed in the aligned bores 113 and 115. The bores 113 extend all of the way through the upper portion 66 and both terminate at an opening 119 in the planar face 114. A pair of jackbolts 111 are inserted into the bores 113 and each abuts against one of the dowel pins 117 disposed in the aligned bores 113 and 115. When the jackbolts 111 are threaded into the bores 113, the jackbolts 111 apply forces against the dowel pins 117 to cause the upper portion 66 to separate from the lower portion 68 thereby to permit cleaning of the interior cavities of the dividing adapter 64. In addition, a threaded tap hole (not shown) into which a screw may be inserted is disposed on a face 121 of each of the dowel pins 117. In the event that the dowel pins 117 become lodged in the bores 115, the screw may be partially screwed into the tap hole leaving a portion of the screw outside of the dowel pin so that it may be grasped, thereby to enable extraction of the dowel pins 117 from the bores 115.

Figures 6A, 6B:
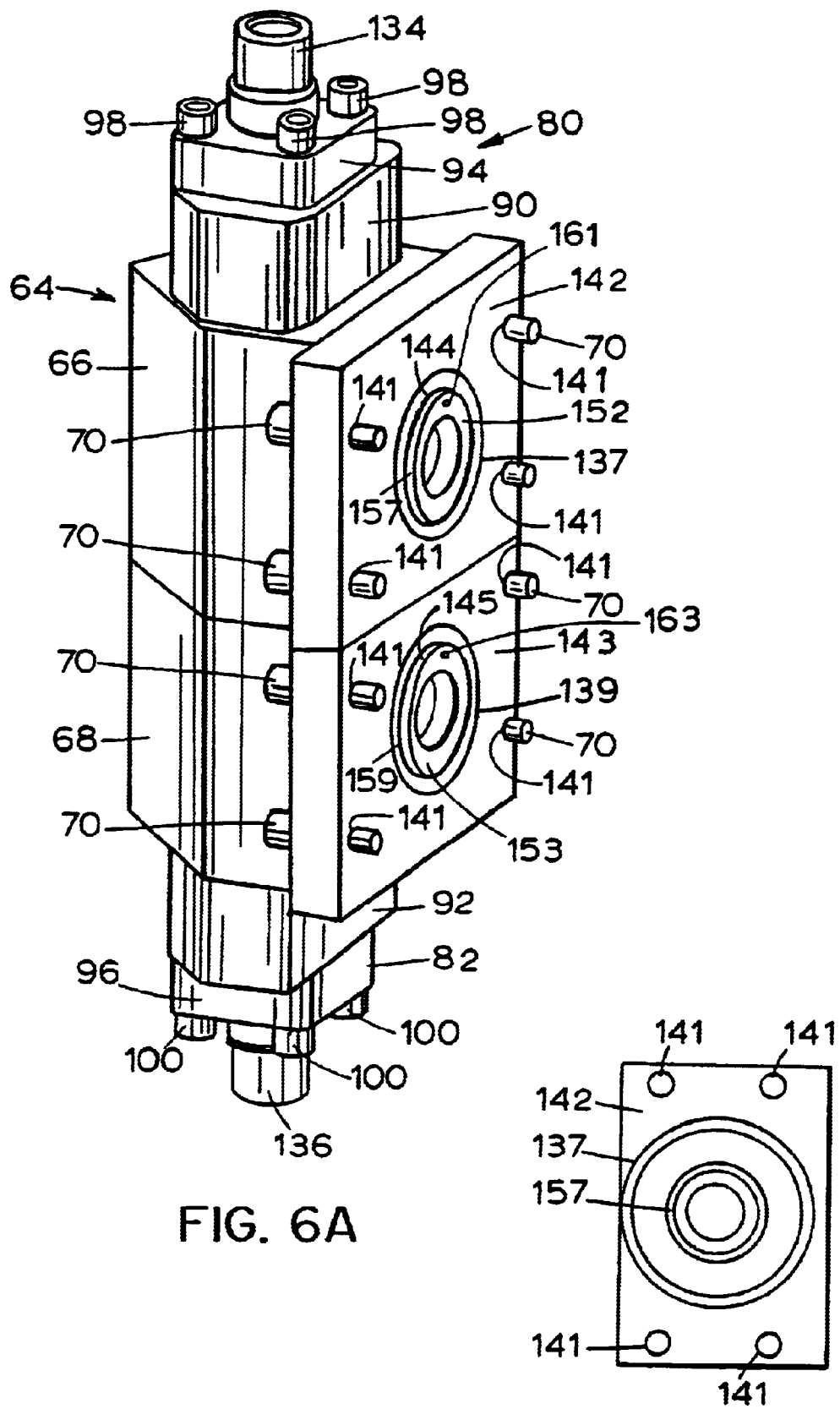
FIG. 6A comprises an isometric view of the dividing adapter of FIG. 4 rotated to reveal a side of the dividing adapter that is secured to the feedblock of FIG. 1.
FIG. 6B comprises a side elevational view of the upper portion of the dividing adapter.

Referring now to FIGS. 6A and 6B, each of the upper and lower portions 66, 68 of the dividing adapter 64 is molded to include a flat, plate-like surface 142, 143, respectively, at which the upper and lower portions 66, 68 of the dividing adapter. 64 are secured to the side 69 of the feedblock 10. Each of the channels 76, 78 (see FIG. 4) terminates at an opening 144, 145, respectively, in the sides 142, 143. As described hereinbefore, the bolts 70 pass through a set of bores 141 in the sides 142, 143 that align with a set of bores 75 (see FIG. 12) disposed in the side 69 of the feedblock 10 to secure the upper and lower portions 66, 68 thereto. A set of soft brass crush rings 152 and 153 are secured in counter bores 157 and 159, respectively, (FIG. 4) radially inside the openings 144, 145 by button head socket screws 161 and 163 and a set of metal o-rings 131, 135 (see FIG. 5A) are disposed in a set of grooves 137, 139, respectively. The soft brass crush rings 152, 153 and the metal o-rings 131, 135 prevent fluid leakage between the upper and lower portions 66, 68, respectively, of the dividing adapter 64 and the feedblock 10.

As described hereinbefore, the secondary flow path 60 branches from the main passage 74 into the channel 76 whereas the secondary flow path 62 branches from the main passage 74 into the channel 78. For clarity, and because the set of two secondary flow paths 60 and 62 are mirror images of one another, only the remainder of the secondary flow path 60 is described in detail.

Figure 7A:
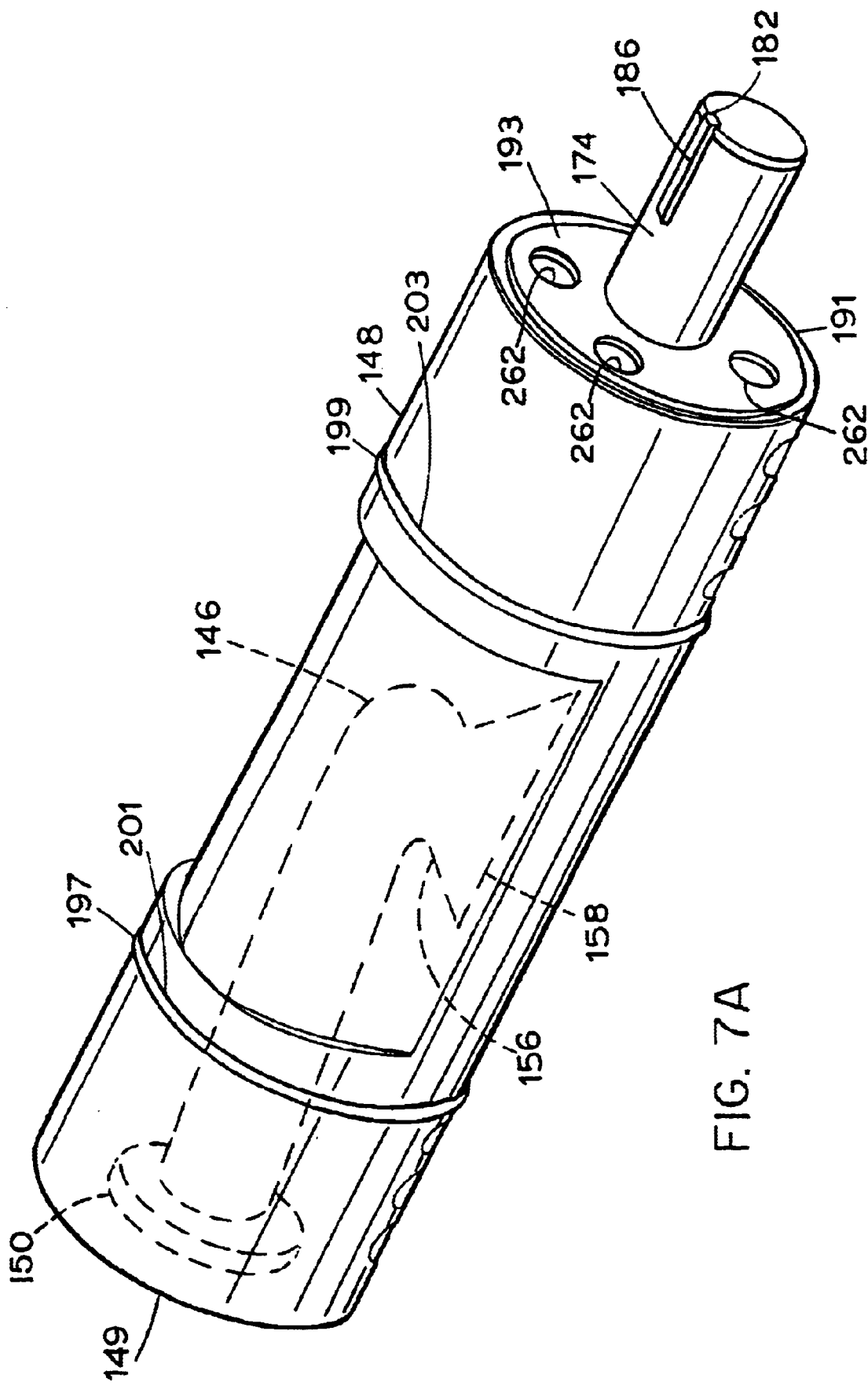
FIG. 7A comprises an isometric view of one of the spools utilized in the feedblock of FIG. 1 which is positioned to reveal a shaft that extends from a first axial end of the spool, FIG. 7B comprises an isometric view of the spool of FIG. 7A positioned to reveal a second axial end opposite the first axial end of the spool, FIG. 8 comprises an isometric view of the feedblock of FIG. 1 with a portion of an upper body of the feedblock removed to reveal the spool of FIGS. 7A and 7B wherein the feedblock is positioned to reveal a third side at which an outlet port is disposed and a fourth side at which an adjustment assembly is disposed.
Figure 7B:
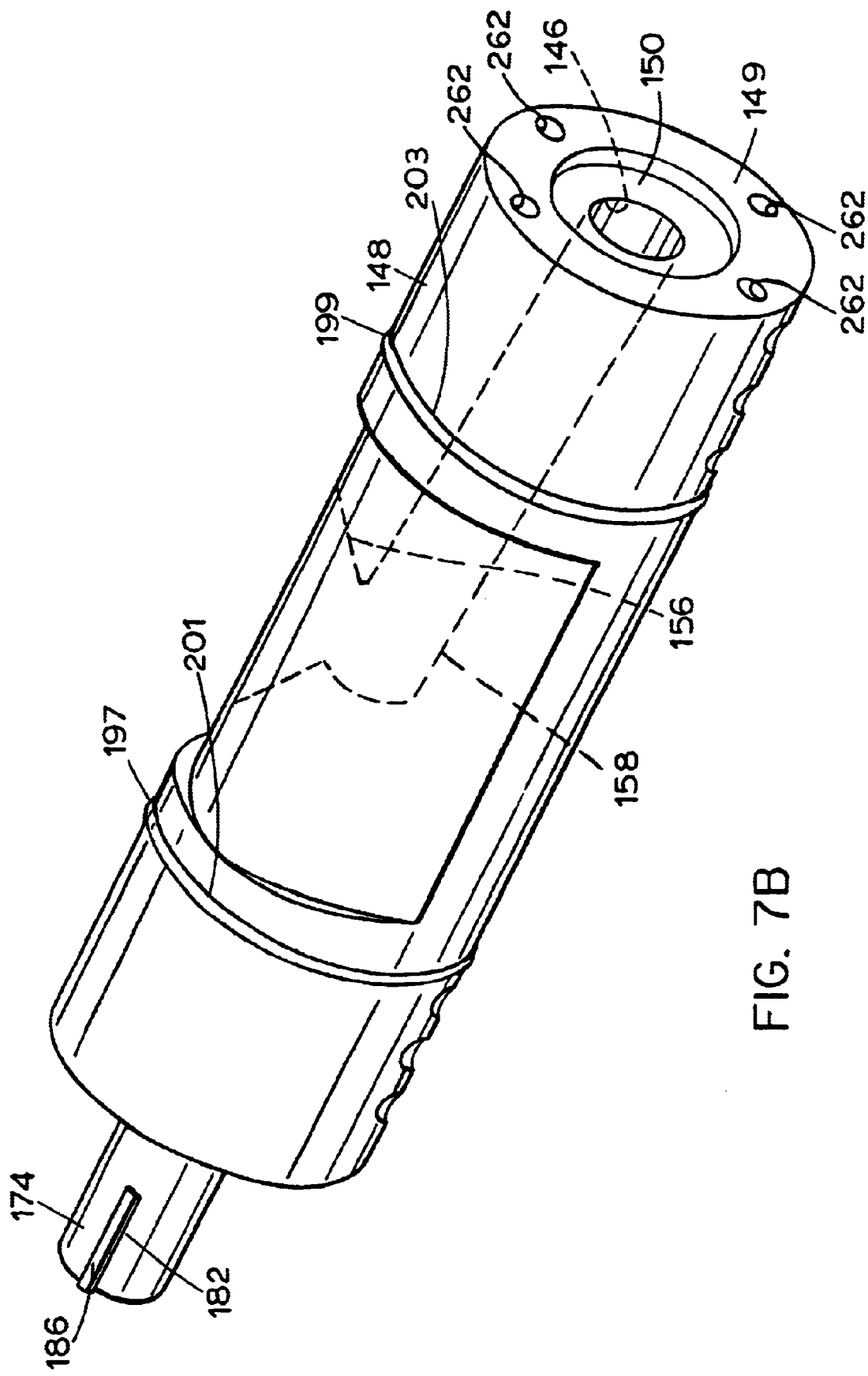
Figure 8:
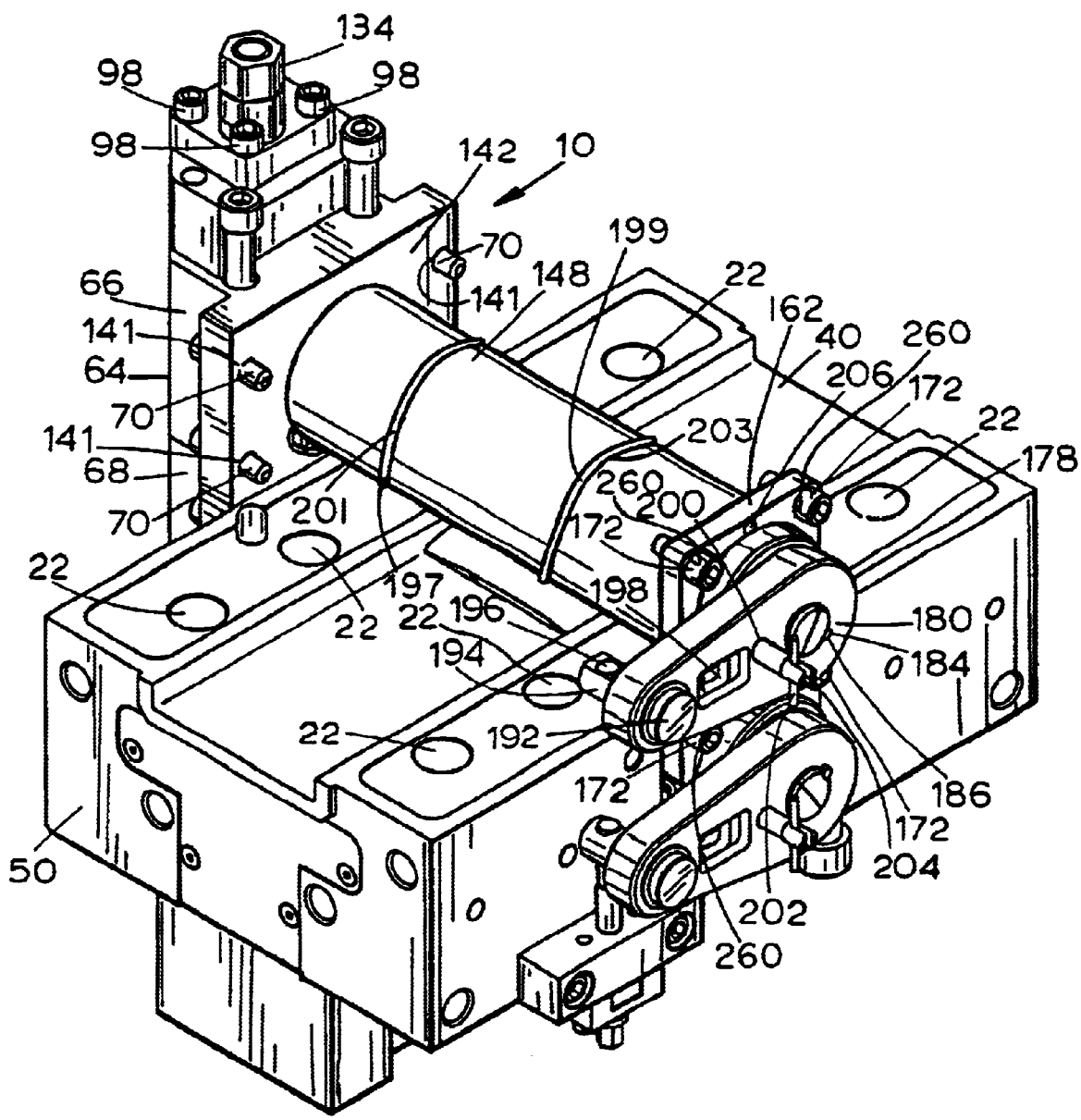

Referring also to FIGS. 7A and 7B, the secondary flow path 60 extends through the opening 144 and into a channel 146 disposed within a spool 148. The soft brass crush ring 152 is disposed such that it is partially disposed in the counter bore 157 (see FIG. 6A) and is partially disposed in a counter bore 150 located in an axial end 149 of the spool 148.

Referring now to FIGS. 2, 7A, 7B and 8, the spool 148 resides within a bore 154 having a substantially circular, cylindrical shape. A set of sealing rings 197, 199 (see FIGS. 7A, 7B and 8) are disposed within a set of grooves 201, 203, respectively, to prevent fluid from leaking out of the spool 148 into the chamber 154. Preferably, although not necessarily, the bore 154 has an inner diameter slightly larger than the outer diameter of the spool 148 to allow rotation of the cylindrical spool 148. The bore 154 and the primary flow path 42 are positioned relative to one another such that when the spool 148 is inserted into the bore 154, a portion of the spool 148 extends into the primary flow path 42.

Referring now to FIGS. 2, 7A, 7B, 8 and 9, the channel 146 residing within the cylindrical spool 148 feeds into a contoured channel 156 that extends radially from the interior of the spool 148 to a contoured outlet slot 158 located on an exterior surface 160 of the spool 148. The contoured outlet slot 158 is positioned on the surface 160 of the portion of the spool 148 that extends into the primary flow path 42 such that molten polymer exiting the contoured outlet slot 158 is deposited in a layer onto the fluidized polymer flowing in the primary flow path 42. Thus, the secondary flow path 60 extends from the dividing adapter 64 to the channel 146, the contoured channel 156 in the spool 148 and the outlet slot 158 and converges with the primary flow path 42 at a convergence zone 165 (see FIG. 2) adjacent to the outlet slot 158.

Because of the geometry of the contoured outlet slot 158, rotation of the spool 148 causes the geometry of the polymeric stream exiting the slot 158 to change shape, thereby enabling adjustment of the width and the height of the secondary polymeric stream as it is being deposited onto the polymeric stream flowing in the primary flow path 42.

Alternatively, the geometry of the outlet slot 158 may be rectangular, in which case only the height and not the width is changed when the spool 148 is rotated.

Figure 10A:
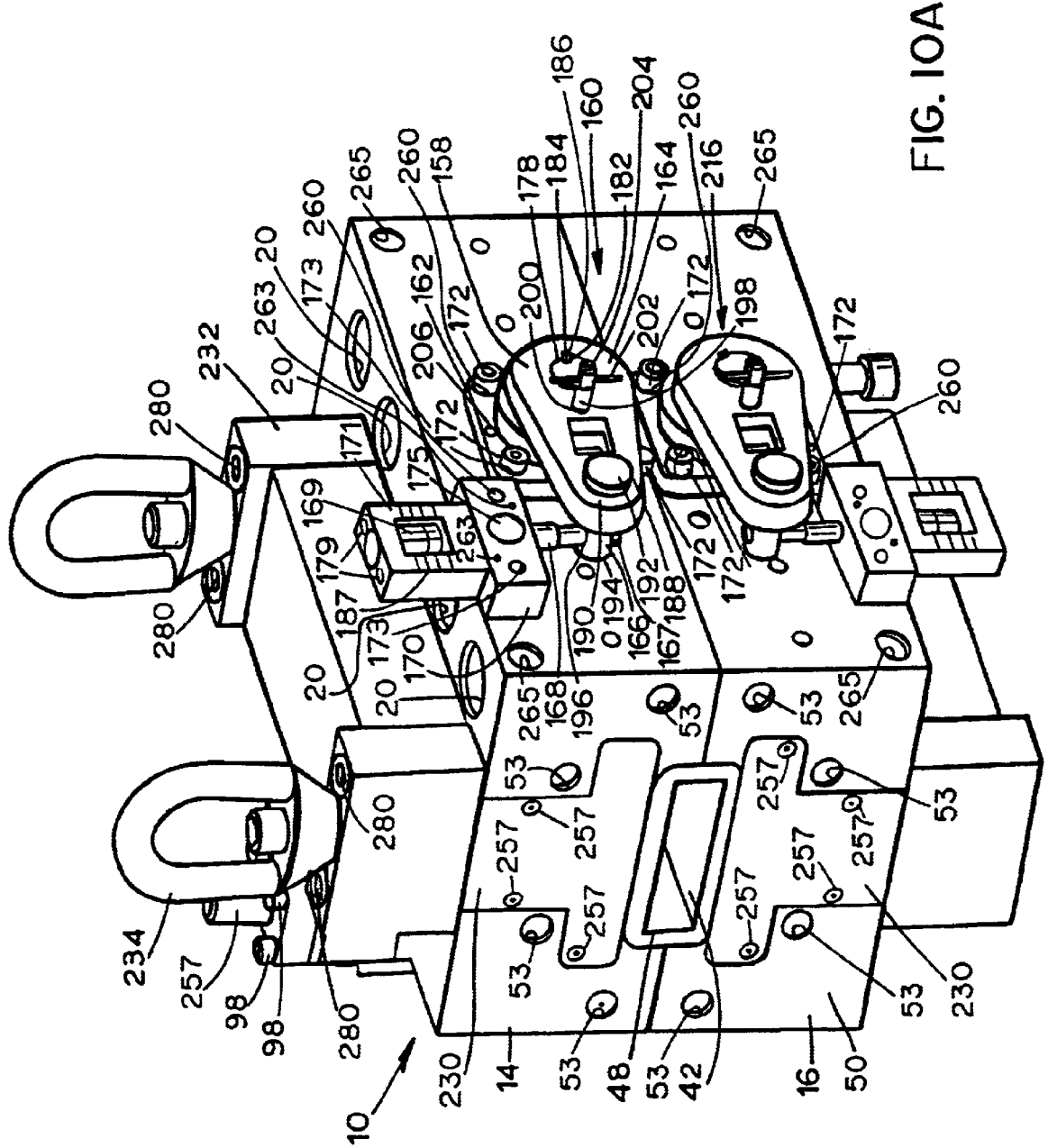
FIG. 10A comprises an isometric view of the feedblock of FIG. 1 positioned to reveal an adjustment assembly disposed on the fourth side of the feedblock.
Figure 10B:
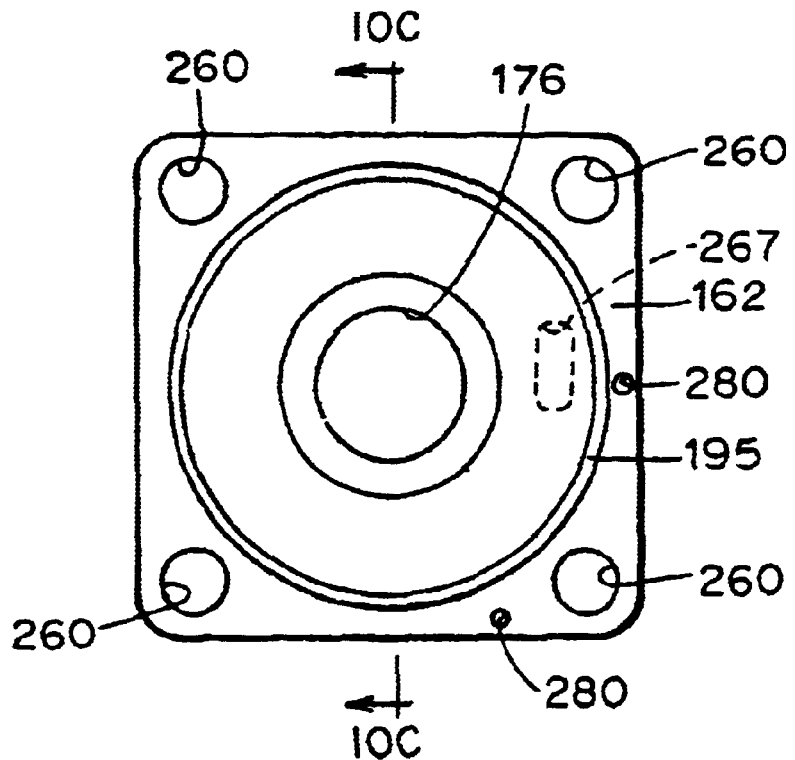
FIG. 10B comprises a side elevational view of the spool retainer by which a first end of the spool is rotatably supported wherein the spool retainer is positioned to reveal a surface of the spool retainer that abuts against the feedblock and the spool.
Figure 10C:
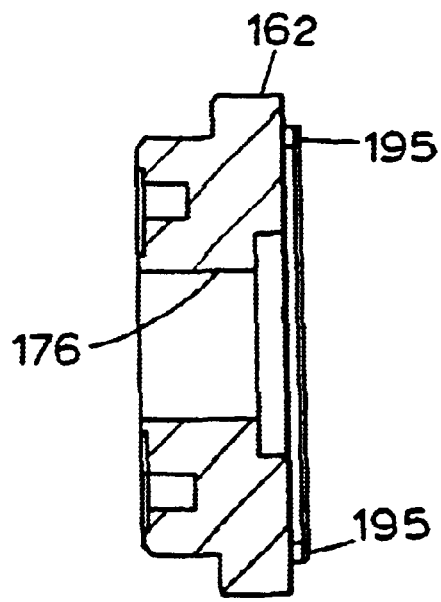
FIG. 10C comprises a cross-sectional view taken generally along the lines 10C—10C of FIG. 10B.

Referring still to FIGS. 7A, 7B and also to FIG. 10A, an adjustment assembly 160 is provided that rotates the spool 148 thereby to adjust the height and/or width of the second layer 56. The adjustment assembly 160 includes a spool retainer 162, an elongate adjustment lever 164, an adjustment pin 166, a locking adjustment screw 168 and an adjustment screw retainer 170 upon which is disposed an adjustment screw guide 171. Referring also to FIGS. 10B and 10C, the spool retainer 162 is secured to the side of the upper body 14 of the feedblock 10 by a set of four bolts 172 that extend through a set of four bores 260 disposed in the spool retainer 162 and that further extend into bores 261 (see FIG. 12) disposed in the side of the feedblock 10. A set of bores 280 within which a set of dowel pins (not shown) may be disposed align with a set of holes (not shown) in the feedblock 10 to ensure proper placement of the spool retainer 162 when it is being secured to the feedblock 10. A cylindrical shaft 174 disposed at an axial end 191 of the spool 148 is disposed in a circular bore 176 in the spool retainer 162 and extends through a bore 178 disposed in a first end 158 of the adjustment lever 164. The shaft 174 extends axially from a stepped axial end 193 of the spool 148. A circular outer surface 191 of the end 193 has a diameter slightly smaller than the diameter of a circular flange 195 that extends outwardly from the spool retainer 162. Thus, when the circular, cylindrical shaft 174 extends through the bore 176 in the spool retainer, the annular end 193 of the spool 148 abuts against the spool retainer 162 in a manner such that there is a small annular area of space between the outer surface 191 and the flange 195. A flexible graphite packing material, such as, for example, the flexible graphite packing made by Palmetto®, may be used to fill this area thereby to create a seal between the stepped axial end 193 of the spool 148 and the flange 195 and, thus, between the spool 148 and the spool retainer 162. A set of threaded bores 262 may also be provided on both of the axial ends 191, 149 of the spool 148 to facilitate removal of the spool 148 from the feedblock 10 for cleaning and/or servicing.

Figure 9:
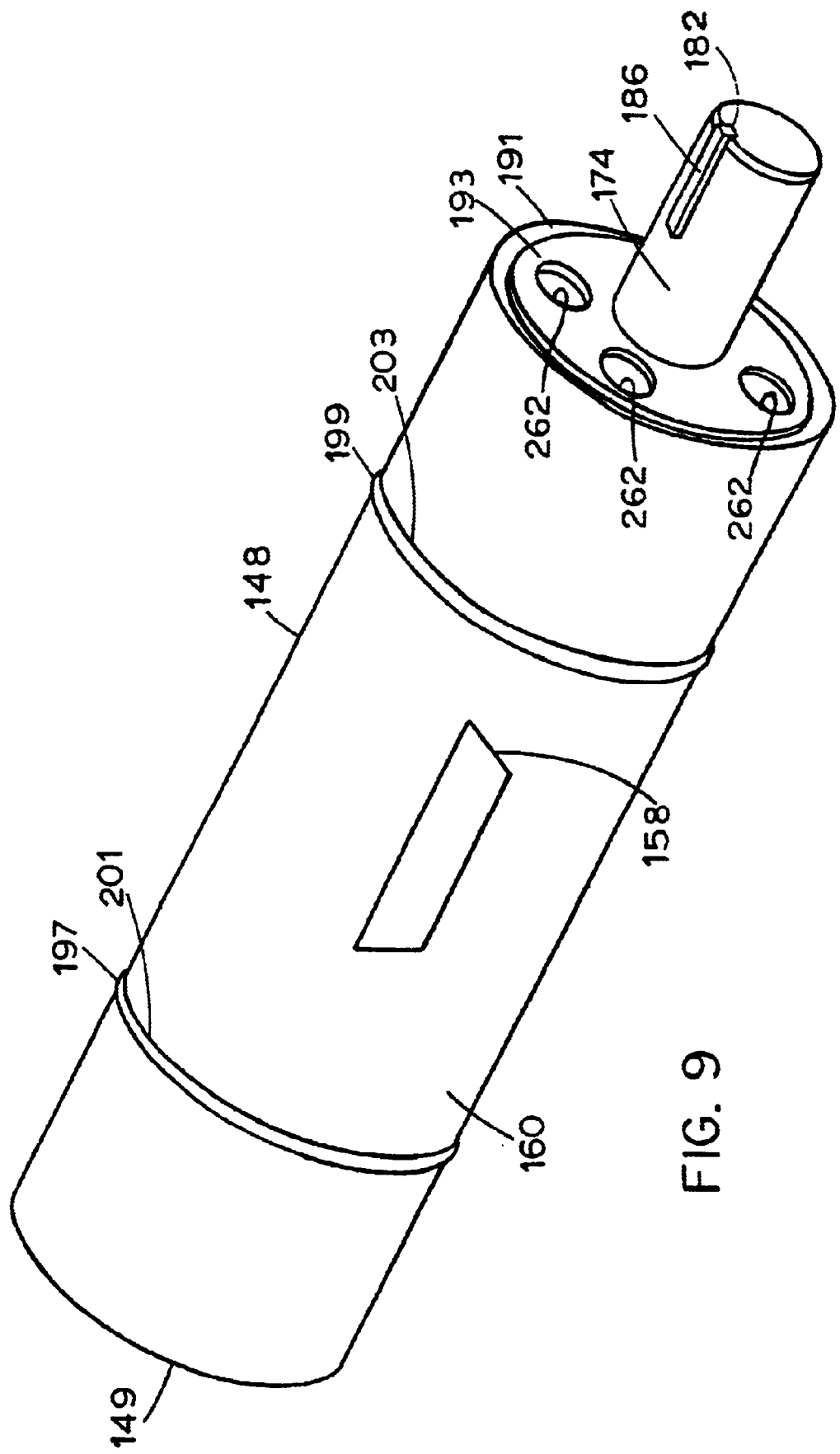
FIG. 9 comprises an isometric view of the spool of FIG. 7A rotated to reveal a contoured outlet slot disposed on an outer surface of the spool.
Figure 10D:
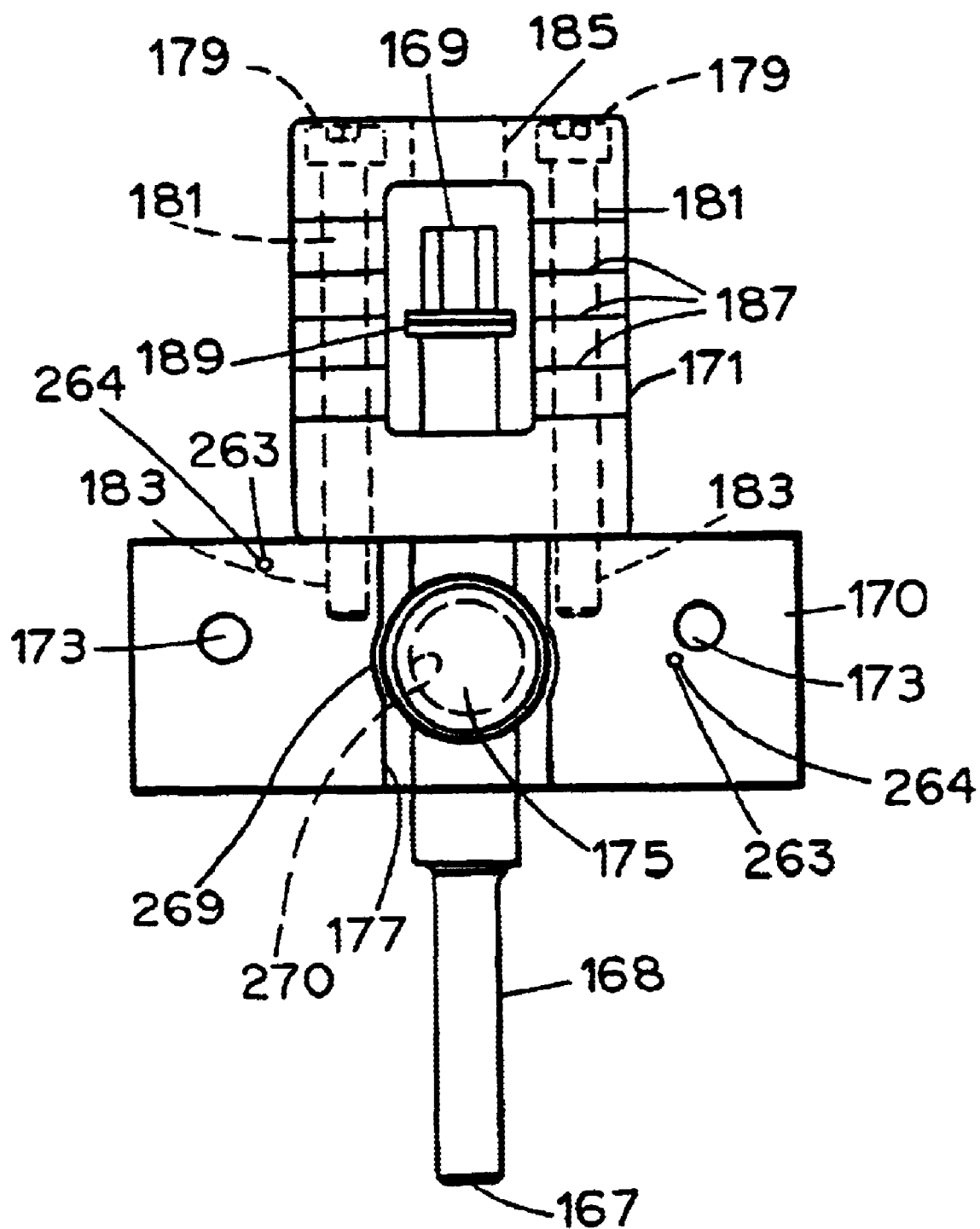
FIG. 10D comprises a side elevational view of an adjustment screw retainer and a screw guide for enabling rotation of the adjustment lever wherein the adjustment screw retainer is positioned such that the side of the adjustment screw retainer that is disposed adjacent to the side of the feedblock is revealed.
Figure 11:
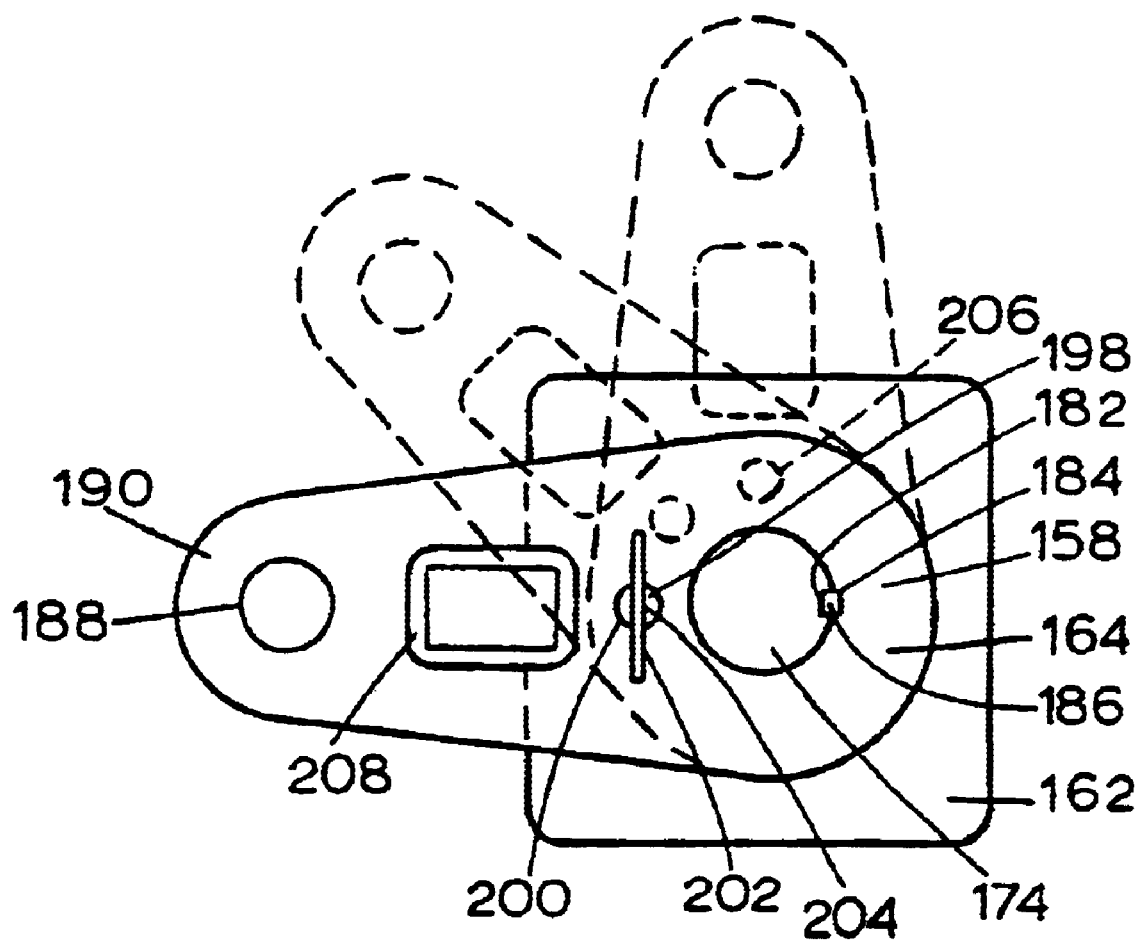
FIG. 11 comprises a side elevational view of an adjustment lever of the adjustment assembly.

Referring still to FIG. 10A and also to FIGS. 9, 10D and 11, the shaft 174 includes a slot 182 that aligns with a slot 184 disposed in the adjustment lever 164. A key 186 is sized to fit snugly into the aligned slots 182 and 184 such that the shaft 174 is keyed for rotation with the adjustment lever 164. The adjustment lever 164 is disposed in a generally horizontal position and has a further bore 188 disposed in a second end 190 thereof. The adjustment pin 166 includes a first end 192 retained in the further bore 188 and a second end 194 having a threaded hole 196 therethrough. A first end 167 of the adjustment screw 168 is threaded through the hole 196 and a second end 169 of the adjustment screw is threaded through a round nut 175 disposed in a circular recess 269 in a channel 177 in the adjustment screw retainer 170 wherein the screw retainer 170 is secured to the feedblock 10 by a set of screws 173. The round nut 175 is captured in the circular recess 269 between the face of the feedblock 10 against which the adjustment screw retainer 170 is disposed and a circular opening 270 disposed on the opposing surface of the adjustment screw retainer 170. Of course, the diameters of both the circular recess 269 and the round nut 175 are larger than the diameter of the circular opening 270 to prevent the round nut from slipping out of the adjustment screw retainer 170. A set of dowel pins 263 that extend through a set of bores 264 in the adjustment screw retainer 170 and that extend into a set of further bores (not shown) disposed in the side of the feedblock 10 are used to ensure that the adjustment screw retainer 170 is disposed on the feedblock 10 at the proper location. The adjustment screw guide 171 is secured to the adjustment screw retainer 170 by a plurality of screws 179 that extend into channels 181 that are aligned with threaded bores 183 disposed in the adjustment screw retainer 170. A hole 185 disposed in the adjustment screw guide 171 permits access to the adjustment screw 168 so that the adjustment screw 168 may be rotated by any suitable tool (such as a wrench which may engage a shaped head of the screw 168). As described hereinbefore, the adjustment screw 168 is threaded into the round nut 175 and is further threaded into the adjustment pin 194. Moreover, the adjustment screw 168 includes two separate sets of threads (not shown), each having a different size pitch, wherein the first set of threads is disposed at the portion of the adjustment screw 168 that is threaded into the round nut 175 and the second set of threads is disposed at the portion of the adjustment screw 168 that is threaded into the adjustment pin 194. The set of threads that engage the round nut 175 are larger in pitch than the set of threads that engage the adjustment pin 194 and the ratio of the pitch sizes of the two different thread sets is selected so that rotating the screw 168 causes the adjustment pin 194 to travel a desired distance either up or down (depending on the direction that the screw 168 is turned). This vertical movement of the adjustment pin 194, in turn, causes the adjustment lever 164 to rotate thereby also causing the shaft 174 and the spool 148 to rotate. To prevent the adjustment pin 194 from falling off of the adjustment screw 168 due to rotation of the adjustment screw 168, the set of threads on the adjustment screw 168 that engage the adjustment pin 194 are placed a sufficient distance from the bottom of the adjustment screw 168 and are further configured to prevent rotation of the adjustment screw 168 beyond a point at which the spool 148 is rotated to a position wherein the outlet slot 158 is fully disposed in the convergence zone 165, i.e., wherein the outlet slot 158 is fully open.

The round nut 175 is disposed in the recess 269 of the channel 177 such that the nut 175 is able to rotate which, in turn, permits lateral movement of the adjustment screw 168 and the pin 194. The lateral movement is required to accommodate the rotation of the adjustment lever 164. The first end 167 of the adjustment screw 168 is smaller in diameter than the second end 169 of the adjustment screw 168 which lengthens the lateral distance that the adjustment screw 168 may move thereby further accommodating the rotation of the adjustment lever 164. The adjustment screw guide 171 further includes a set of markings 187 that are spaced in a manner such that the markings 187, in conjunction with a flange 189 disposed on the screw 168, indicate the position of the spool 148 as it rotates. More particularly, rotation of the adjustment screw 168 causes the flange 189 to move a corresponding distance either up or down. The distance moved by the flange 189 may be measured with the markings 187 and, because the amount of rotation experienced by the spool 148 corresponds to the distance moved by the flange 189, the distance may be used to determine the rotational position of the spool 148.

The adjustment lever 164 may be rotated to a vertical position as shown in FIG. 11 thereby to prevent the flow of material from the secondary channel 60 onto the flow of material through the primary flow path 42. This function is facilitated by a spring-loaded plunger 198 that has threads (not shown) disposed on the exterior surface of the plunger 198 and that has a spring (not shown) residing within the plunger 198. The spring-loaded plunger 198 is threaded into a bore 200 that extends through the adjustment lever 164. A pin 202 forms an interference fit in a groove 204 in the end of the spring-loaded plunger 198. To move the adjustment lever 164 into the vertical position, the adjustment lever 164 is disengaged from the screw 168 by removing the screw 168 from the hole 196 and the adjustment pin 166 is removed from the hole 188 disposed in the adjustment lever 164. After disengaging the adjustment lever 164 from the screw 168 and removing the adjustment pin 166 from the adjustment lever 164, the pin 202 is pulled away from the feedblock thereby causing an end (not shown) of the spring loaded plunger 198 to become disengaged from a groove 267 (see FIG. 10B) in the spool retainer 162 which, in turn, allows the adjustment lever 164 to be rotated into the vertical position. To maintain the adjustment lever 164 in this vertical position, the pin 202 is released, thereby causing the end (not shown) of the spring-loaded plunger 198 to extend into a hole 206 (see FIG. 10A) in the spool retainer 162. Note that, while the pin 202 is engaged in the groove 267, any movement of the adjustment lever 164 is restricted to the distance that the pin 202 can travel in the groove 267. Thus, the groove 267 is sized to permit the adjustment lever 164 to move a distance that is sufficient to allow the spool 148 to rotate a distance that is, in turn, large enough to enable the proper positioning of the contoured outlet slot 158 in the convergence zone 165.

As described hereinbefore, the secondary flow path 60 is a mirror image of the secondary flow path 62. Thus, a spool 214 (see FIG. 2) disposed in the lower body 16 is positioned below the primary flow path 42 thereby allowing the third layer 58 (see FIG. 3) of fluidized polymer to be deposited in a sandwich-like manner onto the first layer 52 flowing in the primary flow path 42 (see FIG. 3). An adjustment assembly 216 (see FIG. 10A) identical to the adjustment assembly 160 is secured to the lower body 16 for adjustment of the spool 214 (see FIG. 2) disposed in the lower body 16.

Referring again to FIG. 2, one or more heaters 218 are disposed in a like number of recesses 220 in the upper and lower bodies 14, 16 of the feedblock 10. The heaters 218 are supplied electric power and develop heat which is transferred through the feedblock 10 to the polymer in the primary flow path 42. As will be understood by one having ordinary skill in the art, to promote thermal transfer, the feedblock 10 may be fabricated from any thermally conductive material, such as, for example, stainless steel.

Referring still to FIG. 2, a plurality of thermocouples 226 are inserted into cavities 228 disposed at various locations in the feedblock 10 to measure and control the temperature of the feedblock 10. As will be understood by one of ordinary skill in the art, the thermocouples 226 and the respective cavities 228 may be disposed at any of a number of locations within the feedblock 10.

To enable fine tuning of the height of the second and third layers 56, 58 a first set of further heater elements 222 is disposed in the upper body 14 of the feedblock 10 parallel to the primary flow path 42 and a second set of further heater elements 224 is disposed in the lower body 16 of the feedblock 10 parallel to the primary flow path 42. The electric power supplied to the pluralities of heaters 222, 224 is controlled to control, in turn, the viscosities of the second and third layers 56, 58. The viscosities of the second and third layers 56, 58 affect the profiles of the second and third layers 56, 58 as such layers exit the feedblock 10 together with the first layer 52. For example, the viscosity of the second and third layers 56, 58 can be controlled using the heaters 222, 224 to eliminate any undesired variations or patterns appearing in the surface profiles of these layers 56, 58. To further facilitate control of the viscosity of the second and third layers 56 and 58, the heater elements 222 and 224 are equipped with built-in thermocouples (not shown). Thus, profile control is afforded in a simple and inexpensive manner.

Figure 12:
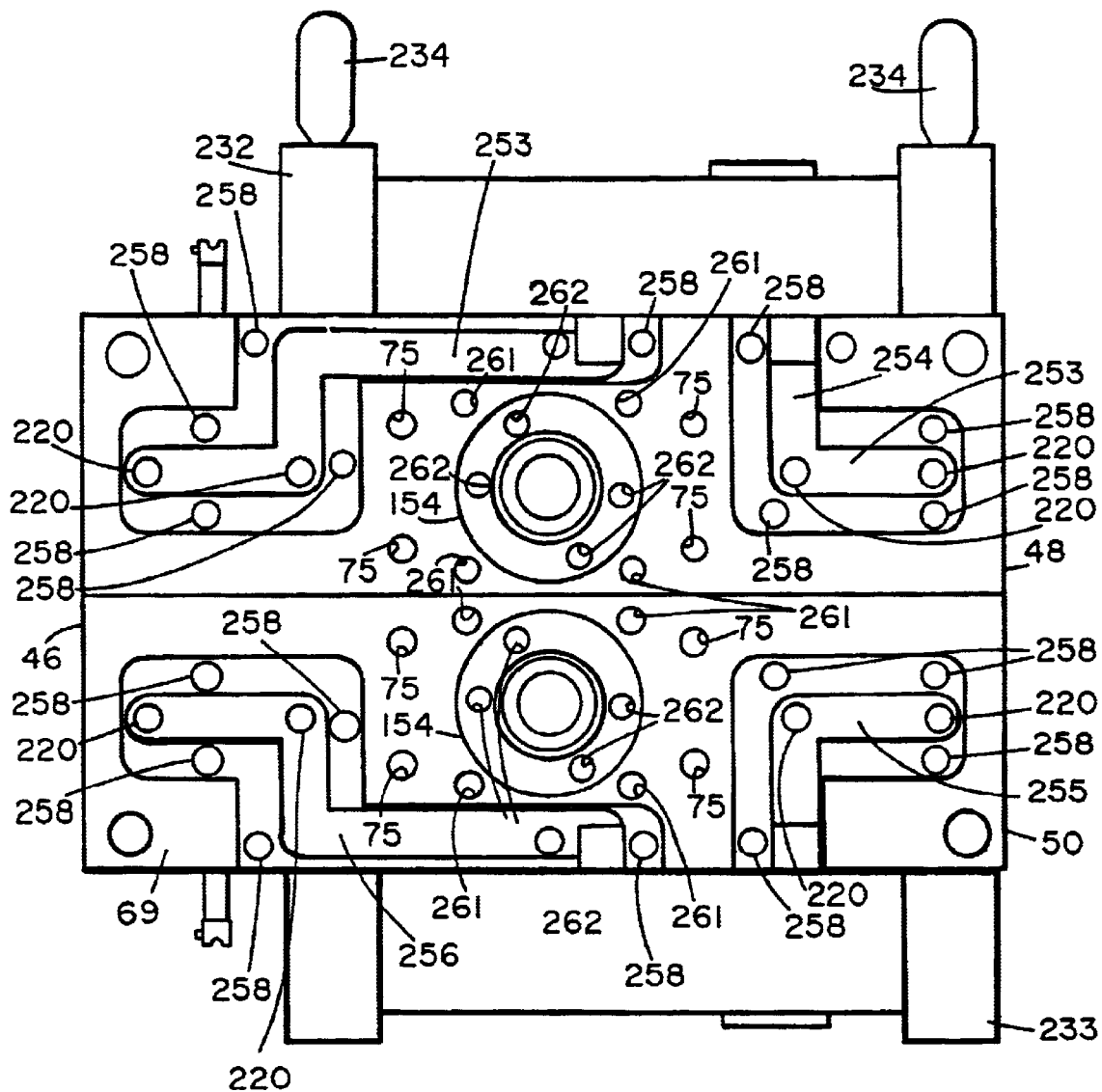
FIG. 12 comprises a side elevational view of the feedblock wherein the feedblock is positioned to show the second side at which the dividing adapter is disposed and further wherein a set of covers are removed from the side of the feedblock to reveal a set of channels and bores disposed therein.

Referring now to FIGS. 1 and 2 and 12, electrical wires (not shown) associated with each of the electric components such as, for example, the heaters 218, 222, 224 and the thermocouples 226, are disposed in a like number of recesses 250, 252, 253, 254, 255, 256 in the feedblock 10 and a plurality of covers 230 (see FIG. 1) that shield the electrical wires are secured to the sides of the feedblock 10 with a plurality of bolts 257 (see FIGS. 1, 2 and 10A) secured in a plurality of bores 258. An additional set of recesses 259 dimensioned to fit extra thermocouples (not shown) are also provided in the event that further temperature monitoring is required. In addition, a case 232 for holding the wires of the electric components is secured to the upper body 14 by a set of screws 266 (see FIG. 1) and a further wire case 233 is secured to the lower body 16. The recesses 250, 253, 254 and 252, 255, 256 provide a pathway by which the electrical wires (not shown) are supplied to the cases 232 and 233, respectively, thereby providing a single routing point at which power may be supplied to the electric components disposed in each of the upper and lower bodies 14, 16. A set of lifting lugs 234 may be fastened to the wire case 232 with a set of screws 167 (see FIG. 1) to facilitate lifting the entire feedblock 10, thereby enhancing the portability of the feedblock 10.

Figure 13:
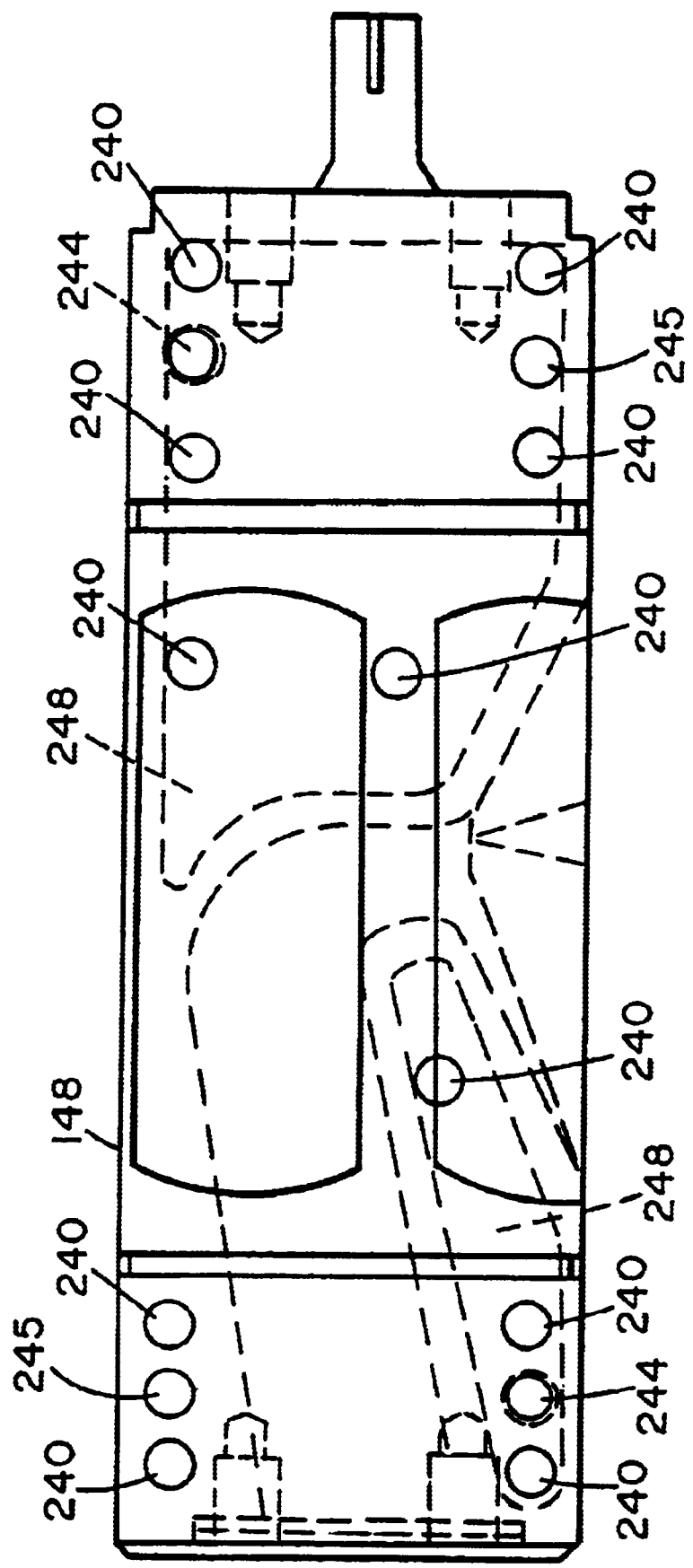
FIG. 13 comprises a side elevational view of the spool 148 to illustrate the positioning of a set of bolts used to secure two halves of the spool together and to further illustrate a set of seal relief areas.

The partitioning of the feedblock 10 into a mirror set of upper and lower bodies 14, 16 allows for easy cleaning of the interior chambers of the feedblock 10 and the feedblock flow paths 42, 60, 62. To further facilitate cleaning of the feedblock 10, the dividing adapter 64 is comprised of the upper portion 66 and the lower portion 68 as described hereinbefore. Referring again to FIG. 2, and also to FIG. 13, the spools 148, 214 are also comprised of two halves that are separable at a partitioning line 236, 238 and that are bolted together by a set of bolts 240, 242. A set of jackbolts 244, 246 that abut against a set of dowel pins 245, 247 is also provided to separate the halves of the spools 148, 214. Note that three of the bolts 240 are omitted from the view of the feedblock 10 presented in FIG. 2. Further, the spool halves, which are generally solid and not hollow abut against one another at a set of surfaces 265 (see FIG. 2). Portions of the surfaces 265 of the one of the spool halves are recessed from the remaining surface of the spool half thereby to form seal relief areas 248. The seal relief areas 248 lessen the likelihood of fluid leakage between the two halves of the spool 148 by reducing the amount of Surface area of the two spool halves that are in contact. In addition, to facilitate machining of the feedblock 10 and to enable lifting of the feedblock during manufacture, set of tabs 265 (see FIGS. 2 and 10A) are provided in the feedblock 10 by which a lifting device (not shown) may be secured to the feedblock 10 or by which the feedblock 10 may be secured in a given position during manufacture.

As described, the feedblock 10 of FIG. 1 may be used to create a three-layer sheet 54 wherein the upper and lower layers 56, 58 comprise a first material and wherein the layer 52 disposed therebetween comprises a second material. However, the feedblock 10 may alternatively be configured to produce any one of a number of different coextrusion flow permutations of one, two or three different materials A, B, C. For example, the feedblock 10, instead of having the dividing adapter 64 wherein a single material is branched to provide two separate layers, may include an adapter (not shown) which has only a single flow path thereby to produce a two layer sheet comprising materials A and B. Alternatively, the feedblock 10 may instead be configured to include a set of two adapters each having a single flow path therein thereby to produce a three-layer sheet comprising materials A, B and C. In addition, the feedblock 10 is not limited to two spools and two secondary flow paths but may instead may be configured to include any number of spools and, thus, any number of secondary flow paths. For example, the upper and lower bodies 14, 16 may each include two or more spools configured to deposit layers upon the primary flow path. Thus, the feedblock 10 may include as many spools as are necessary to produce a desired number of layers.

Referring now to FIG. 12, for symmetry, the set of bores 261 by which the spool retainer 162 is attached to the side of the feedblock 10 and the set of bores 75 by which the dividing adapter 64 is attached to the feedblock 10 are disposed on both sides of the feedblock 10 thereby to support attachment of the dividing adapter 64 and the adjustment assembly 160 to either side of the feedblock 10. Of course, both sets of bores 75 and 261 need not be disposed on both sides of the feedblock 10 if such versatility is not required or desired.

The foregoing description is given for clearness of understanding only, and no unnecessary limitations should be understood therefrom, as modifications within the scope of the invention will be apparent to those skilled in the art.

What is claimed is:

1. A feedblock for a multilayer flow of material comprising:
   a first flow path extending between an inlet and an outlet;
   a rotatable member having a second flow path extending therethrough wherein the second flow path joins the first flow path at a convergence zone intermediate the inlet and the outlet to create the multilayer flow of material from the convergence zone toward the outlet; and
   an assembly coupled to the rotatable member and operative to control the amount of rotation thereof to change the size of the convergence zone, wherein a thermoplastic material is flowing in at least one of the flow paths.

2. The feedblock of claim 1, wherein the rotatable member comprises a hollow spool.

3. The feedblock of claim 1, wherein the convergence zone is defined by an opening in the rotatable member.

4. The feedblock of claim 3, wherein the opening is contoured.

5. The feedblock of claim 3, wherein the opening is rectangular.

6. The feedblock of claim 1, wherein the assembly comprises adjustment apparatus coupled to the rotatable member.

7. The feedblock of claim 6, wherein the adjustment apparatus includes an adjustment lever coupled to the rotatable member-and an adjustment screw threaded into a bore carried by the adjustment lever.

8. The feedblock of claim 1, further including indicating apparatus coupled to the rotatable member and operable to indicate a position of the rotatable member.

9. The feedblock of claim 1, further including an adapter in fluid communication with the second flow path.

10. The feedblock of claim 1, wherein the rotatable member comprises a first rotatable member and wherein the convergence zone comprises a first convergence zone, the feedblock further comprising:
   a second rotatable member having a third flow path extending therethrough wherein the third flow path joins the first flow path at a second convergence zone intermediate the inlet and the outlet; and
   a second assembly selectively operable to rotate the second rotatable member and thereby change a size of the second convergence zone.

11. The feedblock of claim 10, further including an adapter coupled to the second and third flow paths.

12. The feedblock of claim 11, wherein the adapter includes a main passage that branches into a set of two secondary passages and wherein a different one of each of the two secondary passages is coupled to the second and third flow paths.

13. The feedblock of claim 1, in combination with a formable material flowing in the second flow path and into the convergence zone wherein the change in the size of the convergence zone causes a change in a size of the thermoplastic material as it flows into the convergence zone.

14. The feedblock of claim 13, wherein the change in the size of the thermoplastic material comprises a change in the width of the thermoplastic material.

15. The feedblock of claim 13, wherein the change in the size of the thermoplastic material comprises a change in the height and width of the thermoplastic material.

16. The feedblock of claim 1 further comprising a set of heaters disposed within a body of the feedblock and parallel to a portion of the first flow path that is located downstream of the convergence zone.

17. A feedblock for a multilayer flow of material comprising:
   a primary flow path extending between an inlet and an outlet;
   a plurality of rotatable members, each rotatable member having a secondary flow path extending therethrough and wherein each of the secondary flow paths joins the primary flow path at one of a plurality of convergence zones to create the multilayer flow of material from each convergence zone toward the outlet; and
   means for rotating each of the rotatable members coupled to each of the members and operable to control an amount of rotation thereof to change a size of a corresponding one of the convergence zones,
   wherein a thermoplastic material is flowing in at least one of the flow paths.

18. The feedblock of claim 17, wherein each rotatable member comprises a hollow spool.

19. The feedblock of claim 18, wherein each convergence zone is defined by an opening in one of the hollow spools.

20. The feedblock of claim 19, wherein the opening in each hollow spool is contoured.

21. The feedblock of claim 19, wherein the opening in each hollow spool is rectangular.

22. The feedblock of claim 19, wherein the rotating means includes a plurality of adjustment levers each coupled to one of the rotatable members and a plurality of adjustment screws each threaded into a bore carried by one of the adjustment levers.

23. The feedblock of claim 22, further including a plurality of indicators each coupled to one of the rotatable members and operable to indicate a position of the rotatable member.

* * * * *

UNITED STATES PATENT AND TRADEMARK OFFICE
CERTIFICATE OF CORRECTION

| | | |
|---|---|---|
| PATENT NO. | : 6,626,206 B1 | |
| APPLICATION NO. | : 09/496022 | |
| DATED | : September 30, 2003 | |
| INVENTOR(S) | : Ulcej et al. | |

It is certified that error appears in the above-identified patent and that said Letters Patent is hereby corrected as shown below:

Title Page
On the face, please correct Inventor name at (75) "John A. Ulcei" to read
-- John A. Ulcej --.

Signed and Sealed this

Twenty-ninth Day of May, 2007

JON W. DUDAS
*Director of the United States Patent and Trademark Office*